(12) United States Patent
Takamatsu et al.

(10) Patent No.: US 9,160,219 B2
(45) Date of Patent: Oct. 13, 2015

(54) AXIAL GAP TYPE BRUSHLESS MOTOR

(75) Inventors: Hiroyuki Takamatsu, Kobe (JP); Koji Inoue, Kobe (JP); Kenichi Inoue, Kobe (JP); Takashi Hase, Kobe (JP); Osamu Ozaki, Kobe (JP); Chikara Ichihara, Kobe (JP); Masakatsu Maruyama, Kobe (JP); Yasushi Maeda, Kobe (JP); Hiroyuki Mitani, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 595 days.

(21) Appl. No.: 13/520,541

(22) PCT Filed: Dec. 6, 2010

(86) PCT No.: PCT/JP2010/007075
§ 371 (c)(1),
(2), (4) Date: Sep. 20, 2012

(87) PCT Pub. No.: WO2011/083530
PCT Pub. Date: Jul. 14, 2011

(65) Prior Publication Data
US 2013/0009508 A1    Jan. 10, 2013

(30) Foreign Application Priority Data

Jan. 6, 2010   (JP) ................................ 2010-001495
Jun. 4, 2010   (JP) ................................ 2010-129037
Jul. 28, 2010  (JP) ................................ 2010-169445
Nov. 2, 2010   (JP) ................................ 2010-246560

(51) Int. Cl.
*H02K 21/24*   (2006.01)
*H02K 1/02*    (2006.01)
(Continued)

(52) U.S. Cl.
CPC .................. *H02K 21/24* (2013.01); *H02K 1/02* (2013.01); *H02K 1/06* (2013.01); *H02K 1/12* (2013.01); *H02K 1/246* (2013.01); *H02K 1/2793* (2013.01); *H02K 3/04* (2013.01); *H02K 21/46* (2013.01)

(58) Field of Classification Search
CPC ............. H02K 1/02; H02K 1/06; H02K 1/12; H02K 1/246; H02K 1/2793; H02K 21/24; H02K 21/46; H02K 3/04
USPC ........ 310/268, 156.35, 156.32, 208, 181, 182
See application file for complete search history.

(56) References Cited

U.S. PATENT DOCUMENTS 3,883,633 A  *  5/1975  Kohler ........................ 310/152
5,663,605 A  *  9/1997  Evans et al. .................. 310/181

(Continued)

FOREIGN PATENT DOCUMENTS

CN        87217225 U       7/1988
CN        101454961 A      6/2009
(Continued)

OTHER PUBLICATIONS

Translation of foreign document JP 05244743 A (Year:1993).*
(Continued)

Primary Examiner — Alex W Mok
(74) Attorney, Agent, or Firm — Studebaker & Brackett PC

(57) ABSTRACT

Disclosed is a brushless motor (1A) which is an axial gap type brushless motor (1A) wherein stators (3A, 4A) comprising a coil (41) and a rotor (2) comprising a permanent magnet (23) are arranged with a gap therebetween in the axial direction. The coil (41) is a band-like wire which is spirally wound such that the width direction of the band-like wire generally coincides with the direction of the magnetic flux that is generated by the permanent magnet (23) of the rotor (2). Consequently, the axial gap type brushless motor (1A) having the above-described structure can be further reduced in eddy current loss in comparison to conventional brushless motors.

15 Claims, 20 Drawing Sheets

(51) Int. Cl.
*H02K 1/06* (2006.01)
*H02K 1/12* (2006.01)
*H02K 1/24* (2006.01)
*H02K 1/27* (2006.01)
*H02K 3/04* (2006.01)
*H02K 21/46* (2006.01)

(56) References Cited

U.S. PATENT DOCUMENTS

| | | | |
|---|---|---|---|
| 5,966,063 A * | 10/1999 | Sato et al. | 336/200 |
| 6,140,726 A * | 10/2000 | Suzuki et al. | 310/89 |
| 6,147,429 A * | 11/2000 | Akemakou et al. | 310/181 |
| 2004/0074564 A1 | 4/2004 | Brunner | 148/105 |
| 2004/0135452 A1* | 7/2004 | Tu et al. | 310/156.32 |
| 2005/0000959 A1* | 1/2005 | Kagan | 219/660 |
| 2005/0057112 A1* | 3/2005 | Lopatinsky et al. | 310/208 |
| 2005/0141148 A1* | 6/2005 | Aikawa et al. | 360/324.11 |
| 2005/0179337 A1* | 8/2005 | Hasebe et al. | 310/268 |
| 2006/0022548 A1* | 2/2006 | Kim et al. | 310/208 |
| 2006/0022552 A1* | 2/2006 | Zhu et al. | 310/268 |
| 2006/0055271 A1* | 3/2006 | Kaneko | 310/208 |
| 2006/0119206 A1* | 6/2006 | Akemakou | 310/181 |
| 2006/0273676 A1* | 12/2006 | Naruse et al. | 310/156.32 |
| 2007/0152535 A1* | 7/2007 | Shibukawa | 310/268 |
| 2007/0266552 A1* | 11/2007 | Roth et al. | 29/605 |
| 2008/0185932 A1* | 8/2008 | Jajtic et al. | 310/181 |
| 2008/0231994 A1* | 9/2008 | Kimura et al. | 360/235.4 |
| 2009/0184598 A1* | 7/2009 | Nakano et al. | 310/156.78 |
| 2009/0200883 A1* | 8/2009 | Halstead | 310/90.5 |
| 2009/0243406 A1* | 10/2009 | Jack et al. | 310/44 |
| 2009/0261675 A1* | 10/2009 | Hsiao et al. | 310/156.01 |
| 2009/0273252 A1 | 11/2009 | Nakamasu et al. | |
| 2010/0019606 A1* | 1/2010 | Mizutani et al. | 310/181 |
| 2010/0084938 A1* | 4/2010 | Palmer et al. | 310/156.36 |
| 2010/0207480 A1* | 8/2010 | Reutlinger | 310/181 |

FOREIGN PATENT DOCUMENTS

| | | | |
|---|---|---|---|
| JP | 01308159 A * | 12/1989 | |
| JP | 03-015255 | 1/1991 | |
| JP | 3-15255 A | 1/1991 | |
| JP | 4-87544 | 3/1992 | |
| JP | 05145143 A * | 6/1993 | |
| JP | 5-244743 A | 9/1993 | |
| JP | 10135040 A * | 5/1998 | |
| JP | 10-309049 | 11/1998 | |
| JP | 2001037106 A * | 2/2001 | |
| JP | 2004-140937 | 5/2004 | |
| WO | WO 03043033 A1 * | 5/2003 | |
| WO | WO 2010070888 A1 * | 6/2010 | |
| WO | WO 2010070900 A1 * | 6/2010 | |

OTHER PUBLICATIONS

International Search Report, issued from the Japanese Patent Office, in corresponding International Application No. PCT/JP2010/007075, mailed Mar. 8, 2011, pp. 1-3.

* cited by examiner

(A) MAGNETIC FIELD NOT PRESENT

(B) MAGNETIC FIELD PRESENT (A)

(B)

AXIAL GAP TYPE BRUSHLESS MOTOR

TECHNICAL FIELD

The present invention relates to a brushless motor, and in particular, relates to an axial gap type brushless motor that has a stator provided with a coil and a rotor provided with a permanent magnet and spaced apart in the axial direction from the stator.

BACKGROUND ART

Compared to a radial gap type brushless motor, the stator of which is provided on the outer peripheral side, the axial gap type brushless motor is a motor with which larger torque can be obtained with a smaller diameter. Thus, the axial gap type brushless motor is desired for application in automobiles and the like.

Such an axial gap type brushless motor is disclosed, for example, in Patent Literature 1. A DC brushless motor disclosed in Patent Literature 1 uses a band-like material for wires of stator coils. The coils are each formed of a wire which is spirally wound such that the width direction of the wire is parallel to the axial direction. The plurality of coils are stacked one on top of the other in the axial direction and connected in parallel to a power source.

In such an axial gap type brushless motor, although it is desired that losses such as an eddy current loss and a hysteresis loss be reduced, the losses are not sufficiently reduced with the above-described related-art DC brushless motor.

CITATION LIST

Patent Literature

PTL 1: Japanese Unexamined Patent Application Publication No. 4-87544

SUMMARY OF INVENTION

The present invention is proposed in view of the above-described situation, and an object of the present invention is to provide an axial gap type brushless motor with which losses can be further reduced than with the related-art axial gap type brushless motor.

In the axial gap type brushless motor according to the present invention, a coil is formed of a band-like wire that is spirally wound such that a width direction of the band-like wire generally coincides with a direction of a magnetic flux generated by a permanent magnet of the rotor. In the axial gap type brushless motor having such a structure, a sectional area of the wire on a surface perpendicular to the magnetic flux can be decreased, and accordingly, an eddy current loss can be reduced.

Objects including the above-described object, features, and advantages of the present invention will be better understood from the following detailed description with reference to the accompanying drawings.

DESCRIPTION OF EMBODIMENTS

Figure 1:
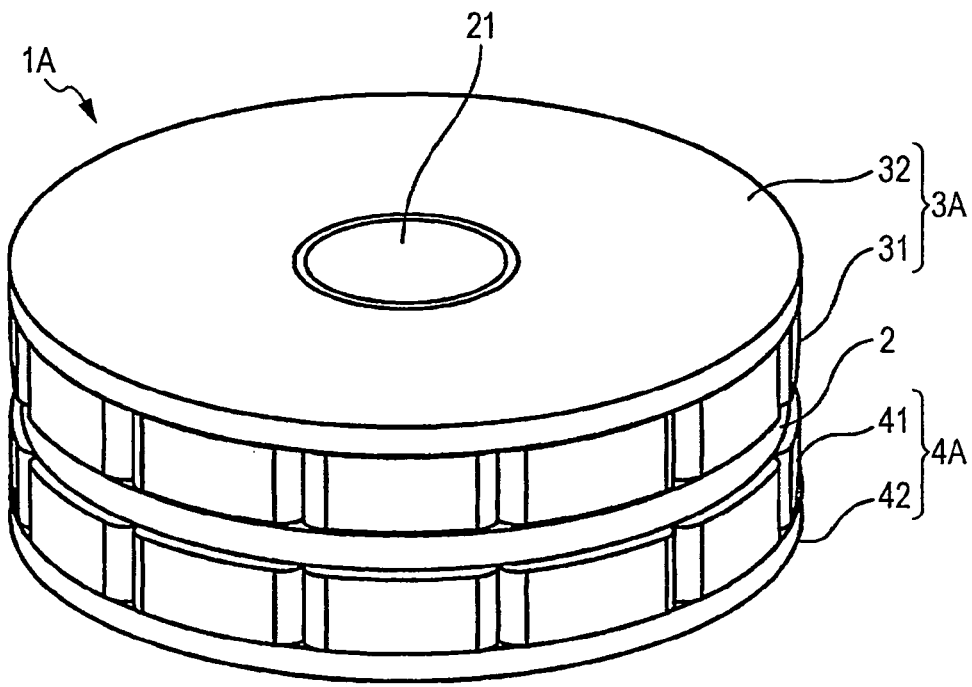
FIG. 1 is a perspective view of the structure of an axial gap type brushless motor according to a first embodiment.

An embodiment according to the present invention will be described below with reference to the drawings. In the drawings, components denoted by the same reference signs indicate the same components and description thereof will be adequately omitted.

(First Embodiment)

FIG. 1 is a perspective view of the structure of an axial gap type brushless motor according to a first embodiment. In order to illustrate the interior of a casing, illustration of the casing is omitted from FIG. 1. An output shaft 21, which actually extends in the axial direction, is shortened in FIG. 1.

A brushless motor 1A is an axial gap type brushless motor, of which a rotor 2 is interposed between a pair of upper and lower stators 3A and 4A disposed so as to be spaced apart from each other in the axial direction. The output shaft 21 is secured to the rotor 2. The diameter and thickness of the brushless motor 1A is, for example, about 30 cm and 10 cm, respectively, and the gap between the rotor 2 and each of the stators 3A and 4A is about 1 mm.

Figure 2:
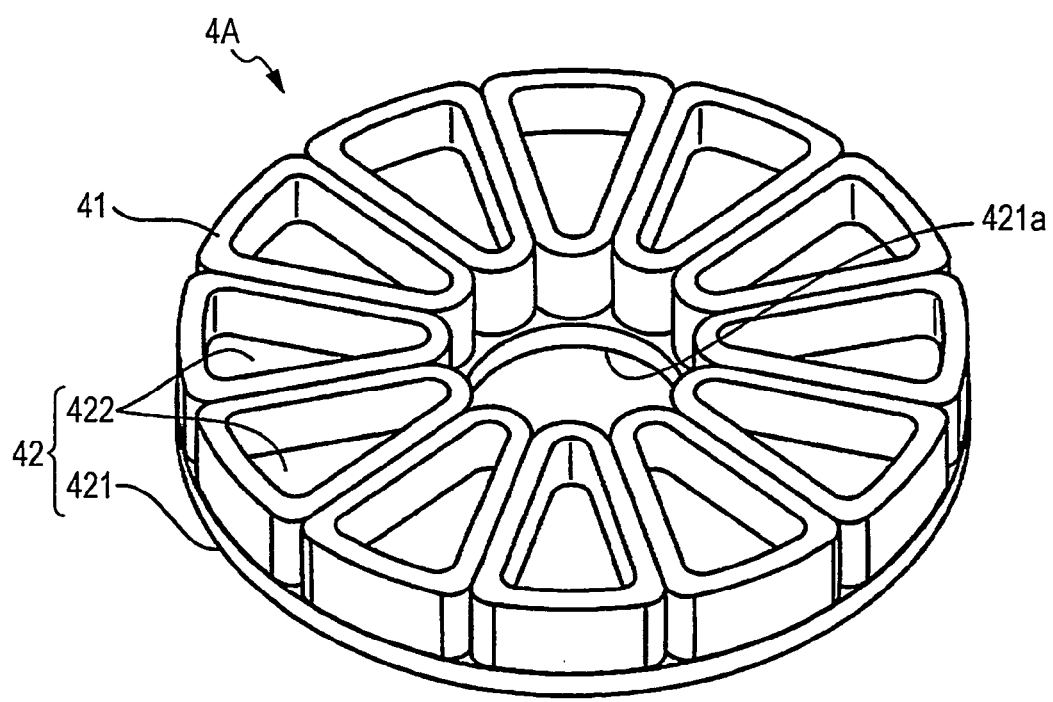
FIG. 2 is a perspective view of the structure of a stator of the axial gap type brushless motor illustrated in FIG. 1.
Figure 3:
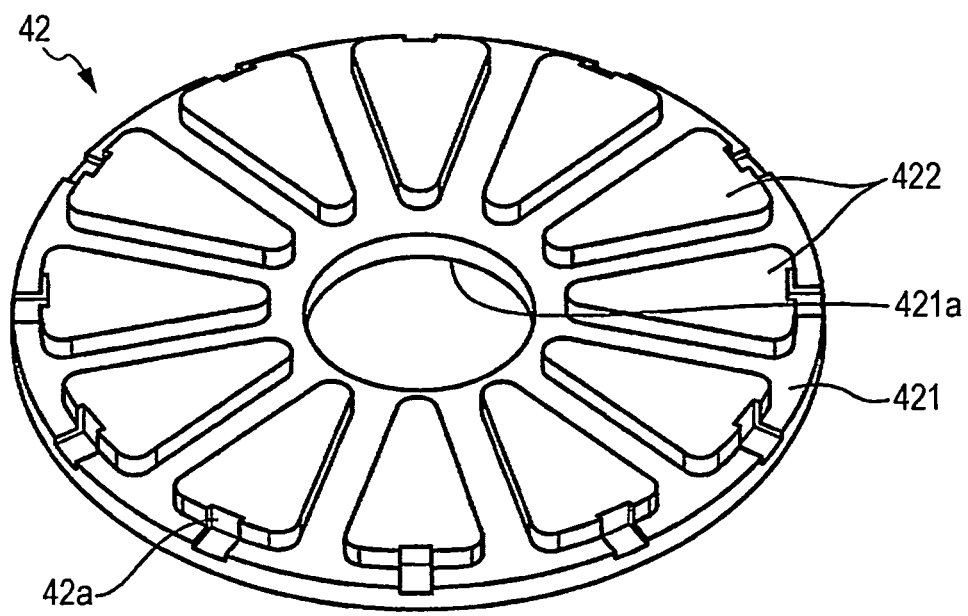
FIG. 3 is a perspective view of the structure of a yoke of the stator illustrated FIG. 2.

FIG. 2 is a perspective view of the structure of the stator 4A, which is one of the stators 3A and 4A of the axial gap type brushless motor illustrated in FIG. 1. Since the structure of the other stator 3A is similar to that of the stator 4A, description thereof is omitted. The stator 4A includes a plurality of coils 41 and a yoke 42. The plurality of coils 41 each use an air core coil so as to reduce losses caused by hysteresis loss. The coils are fitted into the yoke 42. FIG. 3 is a perspective view of the yoke 42 of the stator illustrated FIG. 2. The yoke 42 has a disk-like support plate 421 having an insertion hole 421a at its center. The output shaft 21 is movably inserted through the insertion hole 421a. On a surface of the support plate 421 on the rotor 2 side, the yoke 42 also has a plurality of triangular (substantially sector-shaped) thin plate-shaped teeth 422, which each position a corresponding one of the plurality of coils 41. The triangular teeth 422 protrude so as to be equally spaced apart from one another in a peripheral direction with the vertices of the triangular shapes pointed toward the insertion hole 421a. Part of the yoke 42 where the insertion hole 421a is formed may have a bearing, by which the output shaft 21 is rotatably supported, instead of the insertion hole 421a.

In view of the ease of realizing a desired magnetic characteristic (comparatively high magnetic permeability) and the ease of forming a desired shape, the yoke 42 has magnetic isotropy and is formed of, for example, a soft magnetic powder by pressure molding, molding with heat, adhesive, or the like. The soft magnetic powder is a ferromagnetic metal powder. More specifically, examples of the soft magnetic powder include a pure iron powder, an iron-based alloy powder (Fe—Al alloy, Fe—Si alloy, sendust, permalloy, or the like), an amorphous powder, and an iron powder having an electrically insulating coating such as a phosphate chemical conversion coating formed on the surfaces of the powder particles. These soft magnetic powders can be produced using, for example, an atomization method or the like. Preferably, the soft magnetic powder is a metal material such as, for example, one of the above-described pure iron powder, iron-based alloy powder, or amorphous powder. Using generally used known means, the yoke 42 is formed of a material having a specified density, the material being a material produced by compacting such a soft magnetic powder.

The yoke 42 may be formed of a ferrite having a magnetic isotropy. With such a structure, as is the case with the above-described yoke 42 formed of a soft magnetic powder, a desired magnetic characteristic can be comparatively easily obtained and a desired shape can be comparatively easily formed. Preferably, the powder particles of the soft magnetic powder are covered with an electrically insulating layer. More specifically, it is preferable that the surfaces of the particles of the soft magnetic powder be treated with an electrically insulating coating such as a phosphate chemical conversion coating as described above. The particles of the soft magnetic powder may alternatively be covered with insulating resin or the like.

Figure 4:
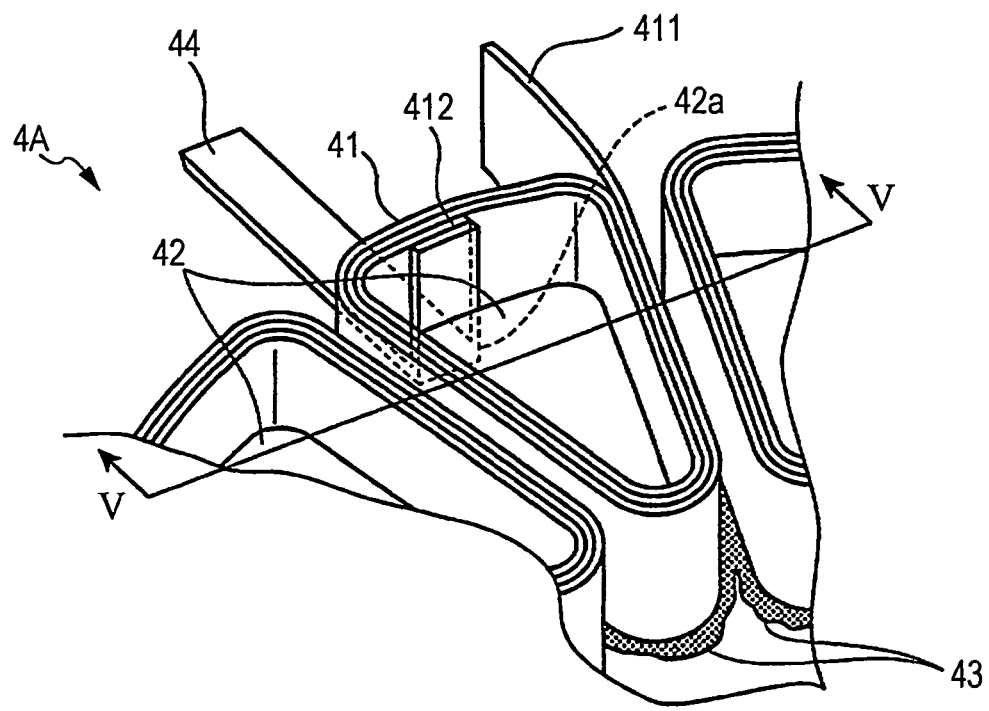
FIG. 4 is an enlarged perspective view of coils of the stator illustrated FIG. 2.
Figure 5:
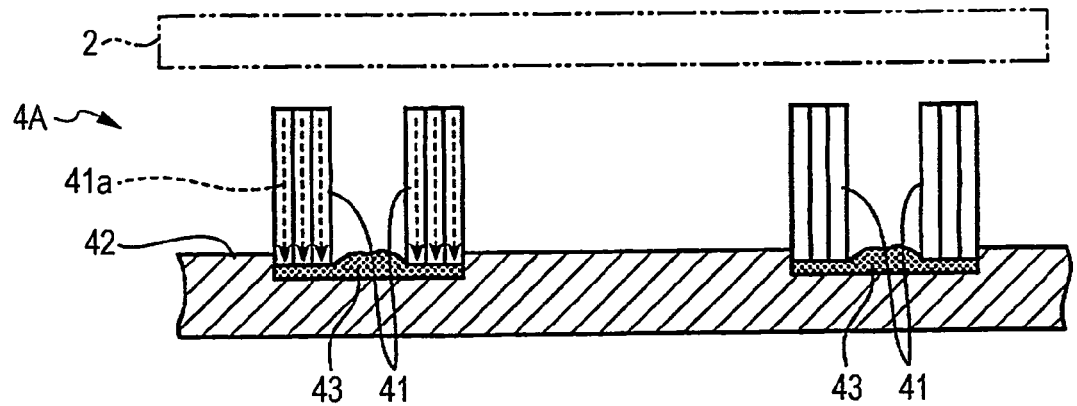
FIG. 5 is a sectional view of the coils of the stator illustrated in FIG. 4 taken along line V-V in FIG. 4.

FIG. 4 is an enlarged perspective view of the coils 41. FIG. 5 is a sectional view of the coils 41 illustrated in FIG. 4 taken along line V-V in FIG. 4. Here, each coil 41 according to the present embodiment is formed of a band-like wire, and spirally wound such that a width direction of the band-like wire generally coincides with a direction of the magnetic flux which is generated by the permanent magnet of the rotor 2. That is, the coil 41 is in the form of a so-called single pancake winding. More specifically, the band-like wire of the coil 41 is spirally wound such that the width direction of the band-like wire is parallel to the axial direction. Furthermore, in the present embodiment, the band-like wire is wound, for example, on a winding frame (not shown), heated, cooled and bonded so as to form the shape of the coil 41. After having been removed from the winding frame, the resultant coil 41 is fitted into one of the plurality of yokes 42. The gap formed between the coil 41 and the support plate 421 is filled with a thermally conductive material 43 such as a silicone grease or alumina. That is, the brushless motor 1A according to the present embodiment further includes the thermally conductive material 43 with which the gap between each coil 41 and the yoke 42 on a corresponding one of the stator 3A and 4A sides, on which the coil 41 is mounted, is filled. In the case where a powder such as, for example, an alumina powder is used as the thermally conductive material 43, the powder is mixed with a specified medium and, at least at an initial stage, has a fluidity.

In the case where such a band-like wire is used, a conducting layer and an insulating layer are stacked in their thickness direction so as to form the coil 41. A conducting material (material of the conducting layer) of the wire is made of, for example, copper, aluminum, an alloy of the copper and aluminum, or the like. The conducting material is covered with insulating resin or the like, thereby ensuring insulation, so that tape surfaces are not in electrical contact with one another. The insulation may be ensured by an insulating sheet interposed between the conducting materials.

The width and the thickness of the wire that forms the coil 41 are respectively, in an example, about 30 mm and 1 mm, and accordingly, the aspect ratio of the wire is about 30:1. The coil thickness of the coil 41 is, in an example, 10 mm or smaller, that is, the number of turns is about ten (in FIG. 4 and the like, for simplification of illustration, the number of turns drawn is decreased). End portions 411, which are end portions of the spirally wound coils 41 on respective outer peripheral sides, are directly routed to the outside. The end portions 411 of the windings of the same phase are connected in parallel to one another as will be described later. End portions 412, which are end portions on respective inner peripheral sides, are soldered to respective lead wires 44. The lead wires 44 are routed through grooves 42a, which are formed in each support plate 421 in areas from outer peripheries of the teeth 422, to the outside. The lead wires 44 of the windings of the same phase are connected in parallel to one another similarly to the end portions 411 on the outer peripheral sides.

In general, an alternating current flowing through a coil flows only in a range of a skin thickness δ of the conducting material, that is, the current does not uniformly flow through the entire section. The skin thickness δ can be generally represented in the following equation:

$$\delta = (2/\omega\mu\sigma)^{1/2}$$

where ω is the frequency (angular frequency) of the alternating current flowing through the coil, μ is the magnetic permeability of the conducting material, and σ is the electrical conductivity of the conducting material. When the thickness of the conducting material is set to be larger than the skin thickness δ, the conducting material has an ineffective portion where no current flows. Thus, the volume of the conducting material is uselessly increased, thereby decreasing efficiency of a winding of the coil. Furthermore, in the case where a magnetic field is applied parallel to a flat surface of the tape-like conducting material, losses caused by the eddy current flowing through the conducting material will increase. In contrast, when the thickness of the conducting material is made to be equal to or less than the skin thickness δ, the conducting material does not have the useless area where no current flows. Thus, the current flows entirely through the conducting material and efficiency of the winding of the coil is improved, thereby allowing the coil to be configured in a compact size. Furthermore, when a magnetic field is applied so as to be parallel to the surface of the tape-like conducting material, losses caused by the eddy current flowing through the conducting material can be significantly reduced. Thus, it is preferable that the wire of the coil 41 use a conducting material having a thickness that is equal to or smaller than the above-described skin thickness δ.

When the thickness and width of the band-like conducting material are respectively given by t and W, although the width W is determined by the magnitude of the current flowing through the conducting material, it is preferable that the following condition be satisfied: t/W≤1/10. In the above example, this ratio is t/W=1/30, which is the limit. When t/W≤1/10 is satisfied, an effective space factor of the conducting material can be improved, and an eddy current loss can be significantly reduced.

Figure 6:
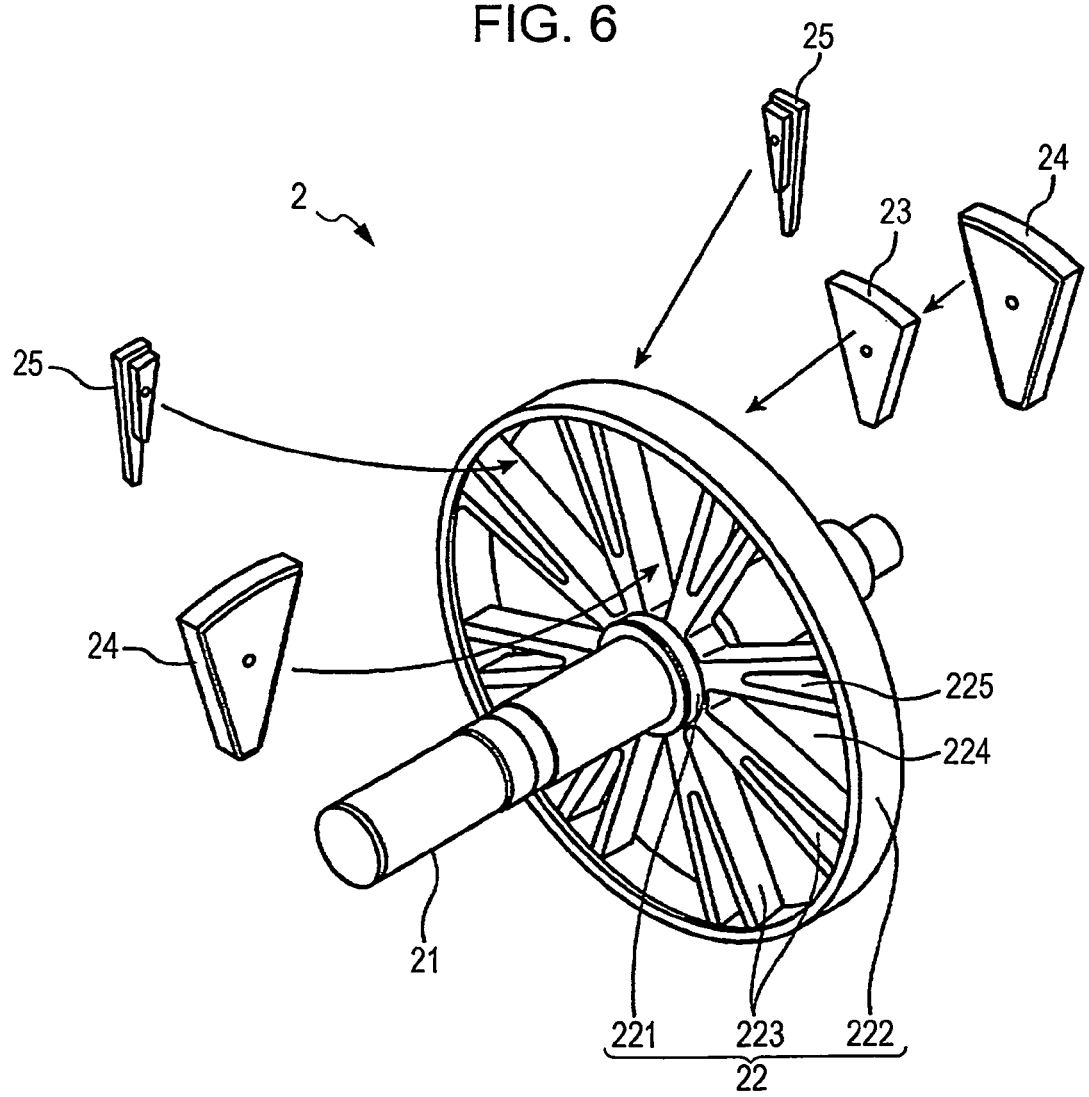
FIG. 6 is an exploded perspective view of the structure of a rotor of the axial gap type brushless motor illustrated in FIG. 1.

FIG. 6 is a perspective view of the structure of the rotor 2. The rotor 2 includes a frame 22, to the center of which the output shaft 21 is secured, a plurality of permanent magnets 23, and magnetic members 24 and 25 attached to the frame 22. The magnetic members 24 and 25 are formed by compacting the soft magnetic powder. The frame 22 is formed of a non-magnetic material such as austenitic stainless steel, and has a hub 221, a concentric outer ring 222, and spokes 223. The output shaft 21 is secured to the hub 221. The spokes 223 extend in radial directions so as to connect the hub 221 to the outer ring 222. In the frame 22, the spokes 223 alternately form large openings 224 and small openings 225, which have a substantially triangular shape (substantially sector shape) seen from the axial direction, in a peripheral direction. The substantially triangular permanent magnets 23 are fitted into the large openings 224. The substantially triangular magnetic members 24 are stacked at the front and rear (top and bottom) of each permanent magnet 23 and fastened to the frame 22 with bolts or the like. A front and rear (top and bottom) pair of the substantially triangular magnetic members 25 are fitted into each of the small openings 225 and fastened to the frame 22 with bolts or the like.

The degree of uniformity of the gap between the stator 3A and the rotor 2 and the degree of uniformity of the gap between the stator 4A and the rotor 2 significantly affect the direction of the magnetic flux that passes through inside the coil 41. A gap L1, by which the stator 3A and the stator 4A are each spaced apart from the rotor 2 at the outermost periphery, and a gap L2, by which the stator 3A and the stator 4A are each spaced apart from the rotor 2 at the innermost periphery, are preferably set as follows: the absolute value of a value (L1−L2)/L3 obtained by dividing the difference between L1 and L2 (L1−L2) by their average value L3 is equal to or less than 1/50. The above-described setting can suppress an increase in eddy currents, which are generated due to the magnetic flux that passes through inside the coils 41 and is not parallel to the axial direction.

Next, operation of the brushless motor 1A according to the present embodiment will be described. In the present embodiment, 12 poles of the coils 41 and eight poles of the permanent magnets 23 are provided, which are each polarized in its thickness direction. These 12 poles of the coil 41 are divided into three groups and connected in parallel in each group. Lorentz forces caused due to currents of the U, V, and W phases of the three-phase alternating current generate rotational torque in the rotor 2, thereby rotating the rotor 2.

In the brushless motor 1A according to the present embodiment, the permeance (operating point) B/H is, as a result of an analysis of an equivalent magnetic circuit, given by the following expression 1-1, and when the B=f(H) is approximated by $B_r(1-H/H_e)$ through straight-line approximation, the following expression 1-2 holds.

[Math. 1]

$$\frac{B}{H} = \mu_0 \cdot \frac{T_{PM}}{2(T_c+g)} \cdot \frac{1}{\left\{1 + \frac{1}{4}\frac{\mu_0}{\mu}\frac{W_{PM}}{T_Y}\frac{W_{PM}}{(T_c+g)} \cdot \left(1 + \frac{s}{W_{PM}}\right)\right\}} \quad (1\text{-}1)$$

$$B = \mu_0 H_e \cdot \frac{T_{PM}}{2(T_c+g)} \cdot \frac{1}{\left\{1 + \frac{\mu_0 H_e}{B_r}\frac{T_{PM}}{2(T_c+g)} + \frac{1}{4}\frac{\mu_0}{\mu}\frac{W_{PM}}{T_Y}\frac{W_{PM}}{(T_c+g)} \cdot \left(1 + \frac{s}{W_{PM}}\right)\right\}} \quad (1\text{-}2)$$

Figure 7:
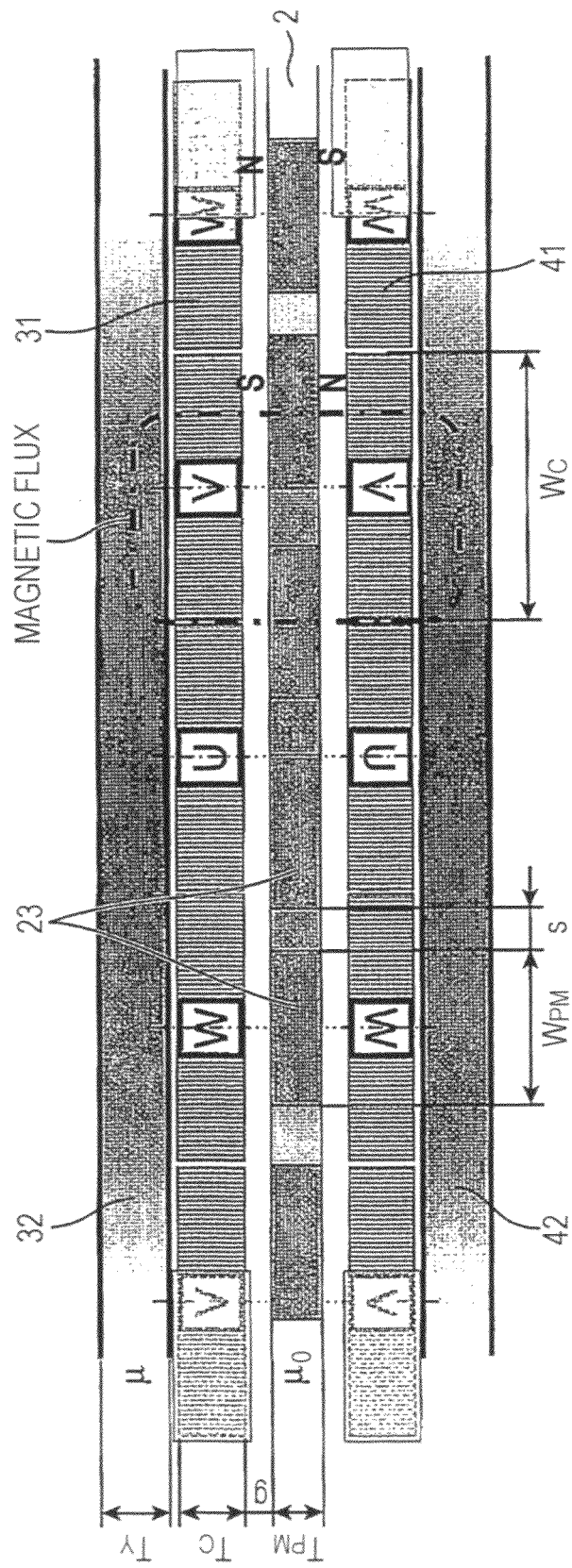
FIG. 7 schematically illustrates a magnetic circuit in the axial gap type brushless motor illustrated in FIG. 1.

Here, μ is the relative magnetic permeability, $\mu_0$ is the magnetic permeability in a vacuum, $H_e$ is the average strength of magnetic fields of magnetic flux line paths, and $B_r$ is an average magnetic flux density of the magnetic flux line paths. As illustrated in FIG. 7, $T_{PM}$ is the thickness of the rotor 2, $T_C$ is the thickness of a coil 31 or the coil 41, g is the gap between the rotor 2 and the stator 3A in the axial direction or the gap between the rotor 2 and the stator 4A in the axial direction, s is a space between the permanent magnets 23 of the rotor 2, $T_Y$ is the thickness of the stator 3A or the stator 4A (thickness of the yoke), and $W_{PM}$ is the width of the permanent magnet 23.

Thus, according to expression 1-2, in order to improve torque, 1) preferably, $H_e$ is greater and $\mu_0 \times H_e \leq B_r$ is greater, 2) preferably, g is close to zero as much as possible, 3) preferably, $T_C \leq T_{PM} \leq 2T_C$, 4) preferably, $(W_{PM})^2/(4T_Y(T_C+g)) \ll \mu/\mu_0$, and 5) preferably, $s \leq T_{PM} \ll W_{PM}$.

In the brushless motor 1A having the above-described structure, when cylindrical wires are used for the coils 41, the cylindrical wire of each coil 41 would have a part where a flow of the current is reduced due to the skin effect. In contrast, as mentioned above, when the band-like (tape-like) wire is used, an area on an inner side (region where high-frequency currents do not flow) of the section of the wire (section of the path where the current flows) can be decreased, and accordingly, current density can be improved and, in addition, the eddy current can be decreased. Thus, larger torque can be obtained, AT (ampere-turn) can be decreased, assembly (and disassembly in recycling) can be easily performed, the strength of the structure of the windings can be improved, and properties against fatigue caused by disconnection or magnetostriction can be improved.

A coil formed of a cylindrical wire would allow air to enter a space between the turns of the wire, thereby degrading thermal conductivity compared to the coil formed of the band-like wire wound up to the same thickness. In the brushless motor 1A having the above-described structure, the band-like (tape-like) wire is used and a single pancake winding structure is employed. As a result of this, as illustrated in FIG. 5, heat produced in the coils 41 is transferred to end portions of the coils 41 as indicated by reference sign 41a due to a good thermal conductivity of the wire such as copper. After that, using the thermally conductive material 43, the heat can be further transferred to the yoke 42 with a good thermal conductivity. As a result, the coil 41 can have improved heat dissipation property. Thus, with the brushless motor 1 having the above-described structure, large torque can be obtained by increasing the coil current, or a smaller brushless motor 1, with which the same amount of the torque is obtainable, can be obtained. In general, the conductivity of a thermally insulating material is about 1 W/mK or smaller. It is sufficient that the thermally conductive material 43 has a high thermal conductivity of 100 W/mK or larger.

Furthermore, in the brushless motor 1A having the above-described structure, the common rotor 2 is interposed between the pair of stators 3A and 4A so as to be driven by both the stators 3A and 4A. Thus, substantially twice as much torque can be realized with a thickness that is far less than twice the thickness. The motor has a so-called Lorentz force motor structure in which rotational torque is obtained from currents generated in the coils 41 and the magnetic fields of the permanent magnets 23 in the above-described structure. Thus, for the brushless motor 1A having the above-described structure, a soft magnetic powder having a comparatively low magnetic permeability can be used as the material of the yoke 42. The soft magnetic powder is compacted so as to form the yoke 42, and accordingly, compared to a case in which electromagnetic steel is used, the cost can be significantly reduced, and the yoke 42 can be formed to have a desired shape.

In the rotor 2, when the frame 22 and the magnetic members 24 and 25 are formed by molding the soft magnetic powder, and the permanent magnets 23 and the magnetic members 24 are magnetized in a strong magnetic field after the rotor 2 has been assembled, assembly of the rotor 2 is facilitated.

In the brushless motor 1A having the above-described structure, the magnetic members 25, which extend from the front surface to rear surface of the rotor 2, are disposed between the permanent magnets 23, and gaps are formed between the magnetic members 25 and the permanent magnets 23. Thus, with the brushless motor 1A having the above-described structure, reluctance torque, which increases magnetic attractive force and magnetic repulsive force produced between the coils 41 and the permanent magnets 23, can be obtained. Here, the gap distances between the 'magnetic members 24 and the gap lengths between the permanent magnets 23 and the magnetic members 25 are preferably greater than the gap length (above-described 1 mm) between the rotor 2 and the stator 3A or between the rotor 2 and the stator 4A. Thus, out of the magnetic flux flowing out of each permanent magnet 23, components of the magnetic flux flowing toward the adjacent permanent magnets 23, magnetic members 25, or the like is reduced, thereby increasing the magnetic flux of the permanent magnet 23 in the normal direction (output shaft 21 direction), and accordingly, increasing torque.

Next, another embodiment will be described.
(Second Embodiment)

Figure 8:
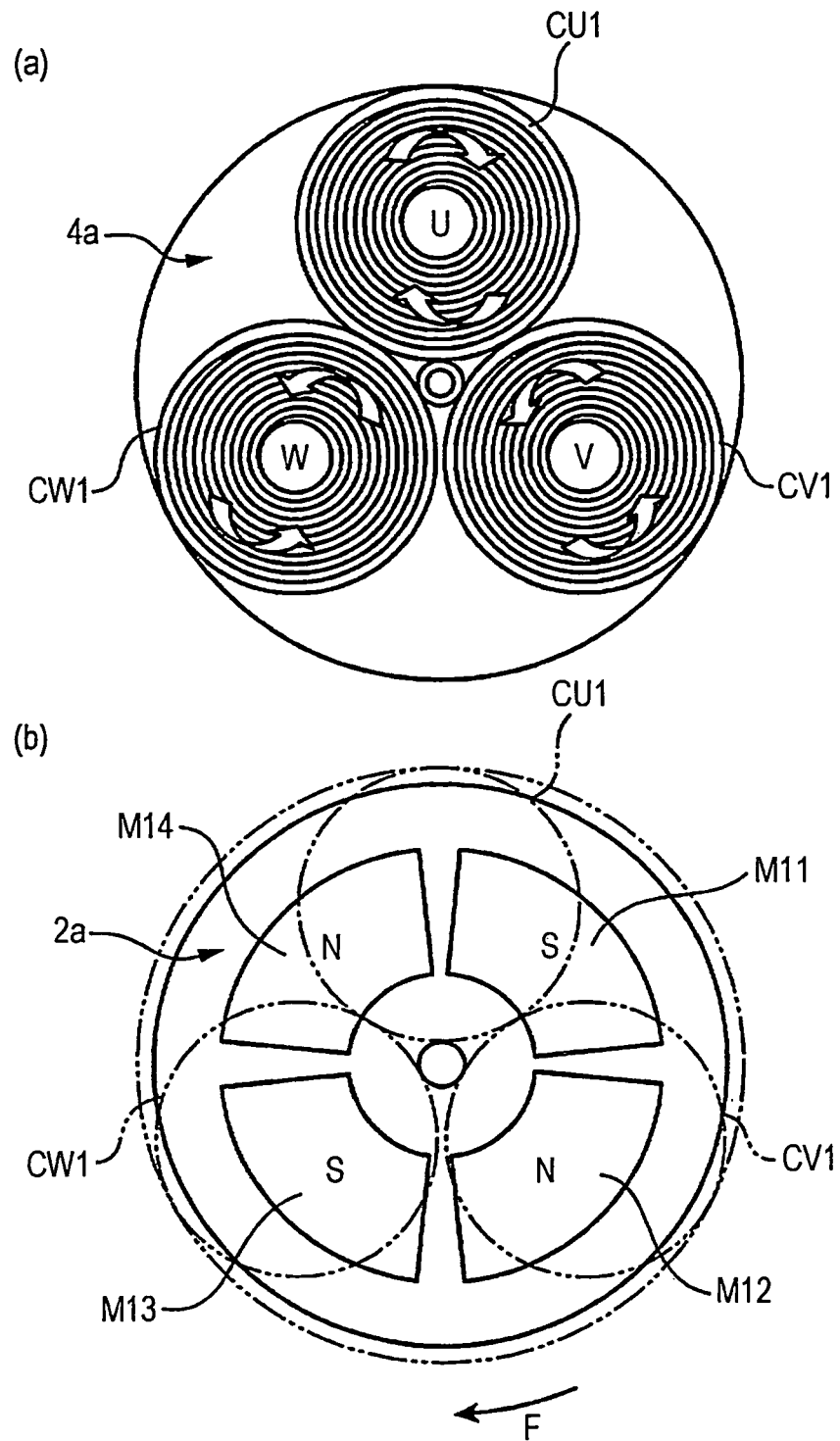
FIG. 8 schematically illustrates a first structural example of an axial gap type brushless motor according to a second embodiment.
Figure 9:
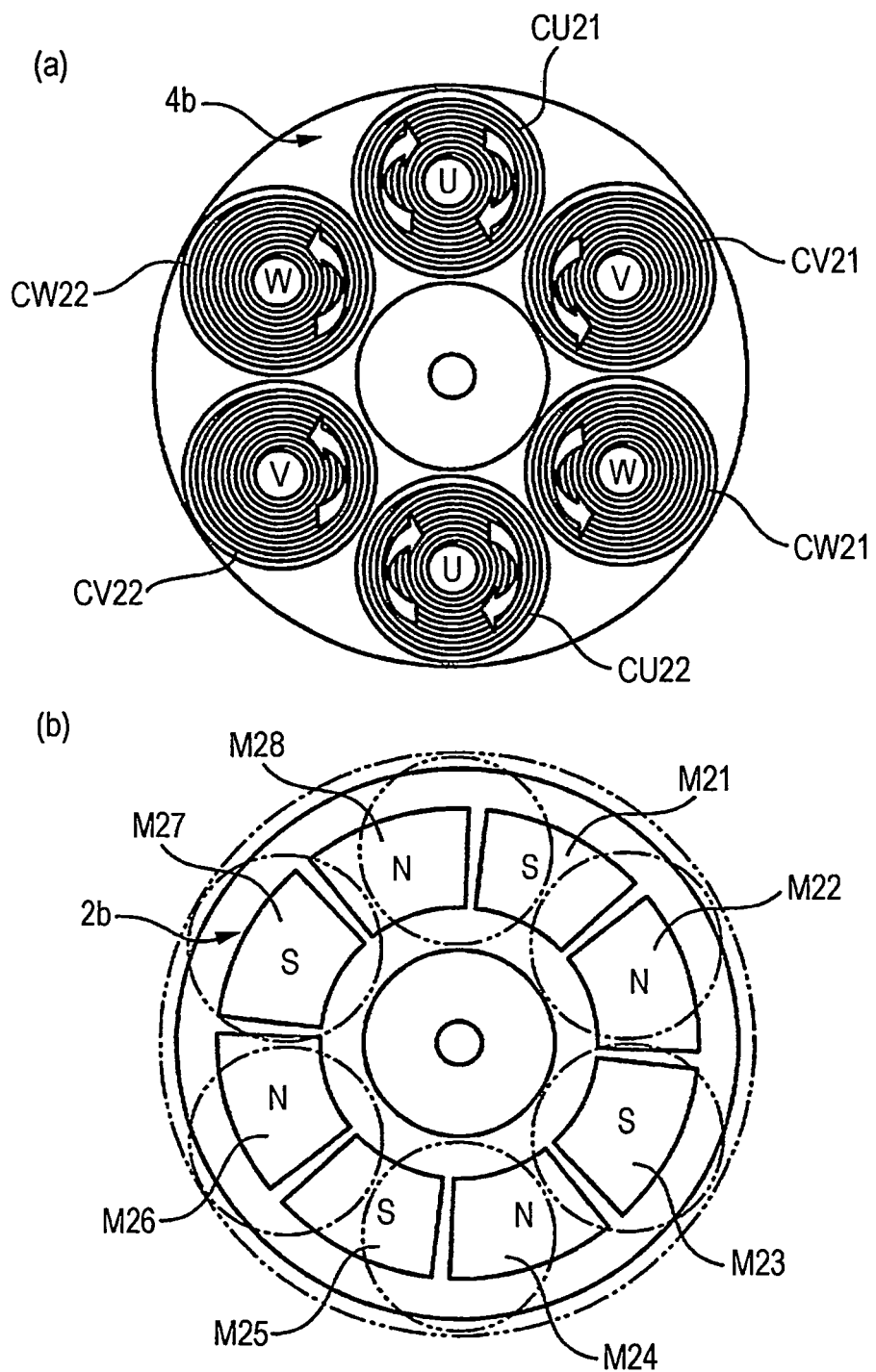
FIG. 9 schematically illustrates a second structural example of the axial gap type brushless motor according to the second embodiment.
Figure 10:
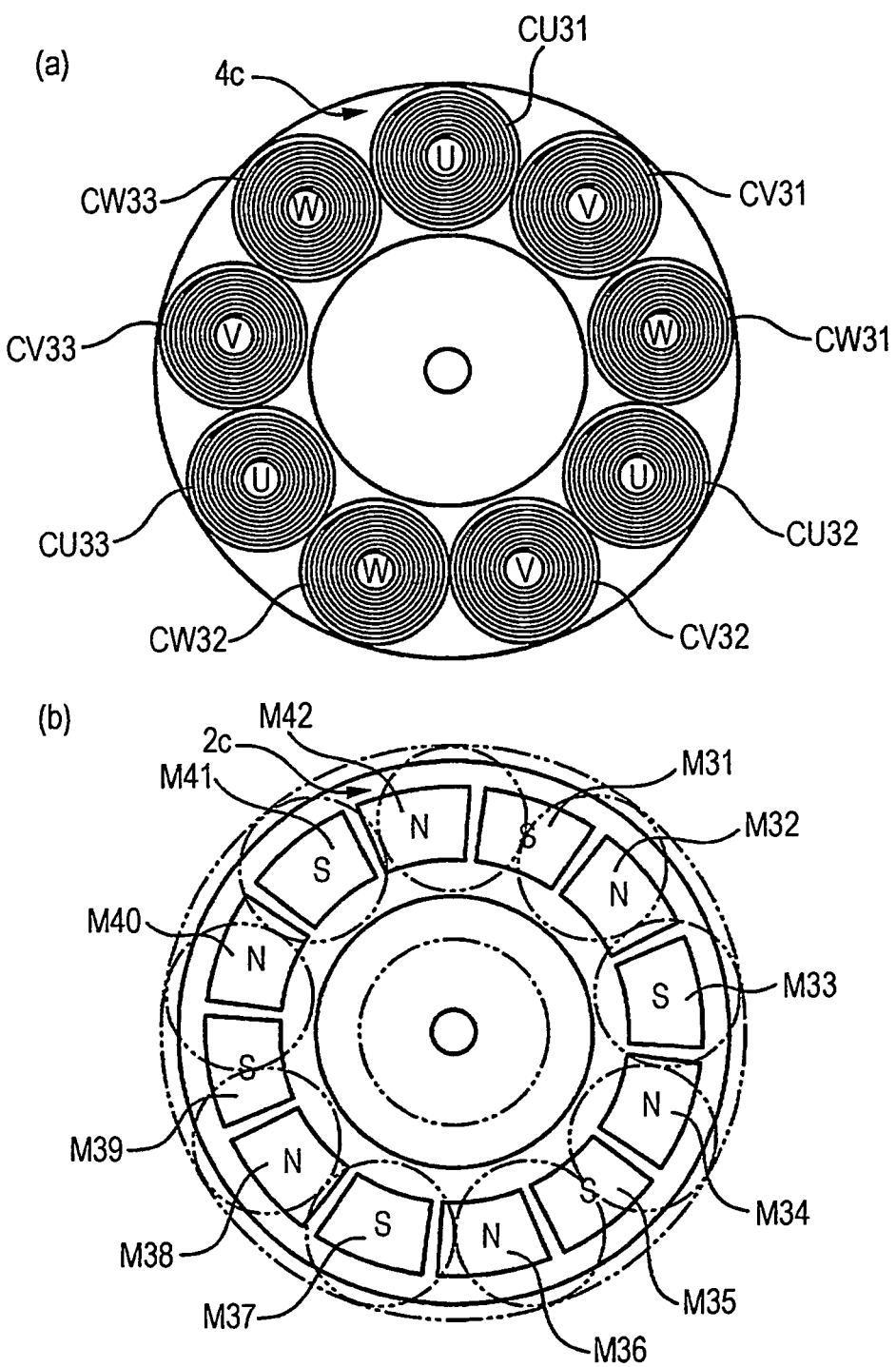
FIG. 10 schematically illustrates a third structural example of the axial gap type brushless motor according to the second embodiment.

FIGS. 8 to 10 illustrate the structures of the brushless motors according to a second embodiment to which cylindrical coils are applied. FIGS. 8, 9, and 10 respectively illustrate stators 4a, 4b, and 4c in schematic front views (a), and respectively illustrate rotors 2a, 2b, and 2c in schematic front views (b). In these brushless motors, with respect to the peripheral directions, the interval between adjacent coils out of cylindrical coils CU1, CV1, and CW1 is different from the interval between adjacent permanent magnets out of permanent magnets M11 to M14, and a period at which the cylindrical coils CU1 to CW1 are arranged is not a multiple of a period at which the permanent magnets M11 to M14 are arranged; the interval between adjacent coils out of the cylindrical coils CU21, CV21, CW21, CU22, CV22, and CW22 is different from the interval between adjacent permanent magnets out of permanent magnets M21 to M28, and a period at which the cylindrical coils CU21 to CW22 are arranged is not a multiple of a period at which the permanent magnets M21 to M28 are arranged; and the interval between adjacent cylindrical coils out of cylindrical coils CU31, CV31, CW31, CU32, CV32, CW32, CU33, CV33, and CW33 is different from the interval between adjacent permanent magnets out of permanent magnets M31 to M42, and a period at which the cylindrical coils CU31 to CW33 are arranged is not a multiple of a period at which the permanent magnets M31 to M42 are arranged (hereafter, the cylindrical coils and permanent magnets are respectively denoted by reference signs C and M when they are generally referred to).

More specifically, when the coil currents are supplied in three phases of U, V, and W, and, for example, as illustrated in FIG. 8, when three poles of the windings CU1, CV1, and CW1 are provided, four poles of the permanent magnets M11 to M14 are provided. For example, as illustrated in FIG. 9, when six poles of the windings CU21, CV21, CW21, CU22, CV22, and CW22 are provided, eight poles of the permanent magnets M21 to M28 are provided. For example, as illustrated in FIG. 10, when nine poles of the windings CU31, CV31, CW31, CU32, CV32, CW32, CU33, CV33, and CW33 are provided, 12 poles of the permanent magnets M31 to M42 are provided. Thus, the relationship between the number of poles of the windings and the number of poles of the permanent magnets is set on the basis of prime numbers different from each other (in the above examples, when the number of poles of the windings is n, the number of poles of the permanent magnets is 2·2(n/3)). By doing this, the interval between the adjacent coils C and the interval between the adjacent permanent magnets M cannot be made to match each other.

Next, another embodiment will be described.
(Third Embodiment)

Figure 11:
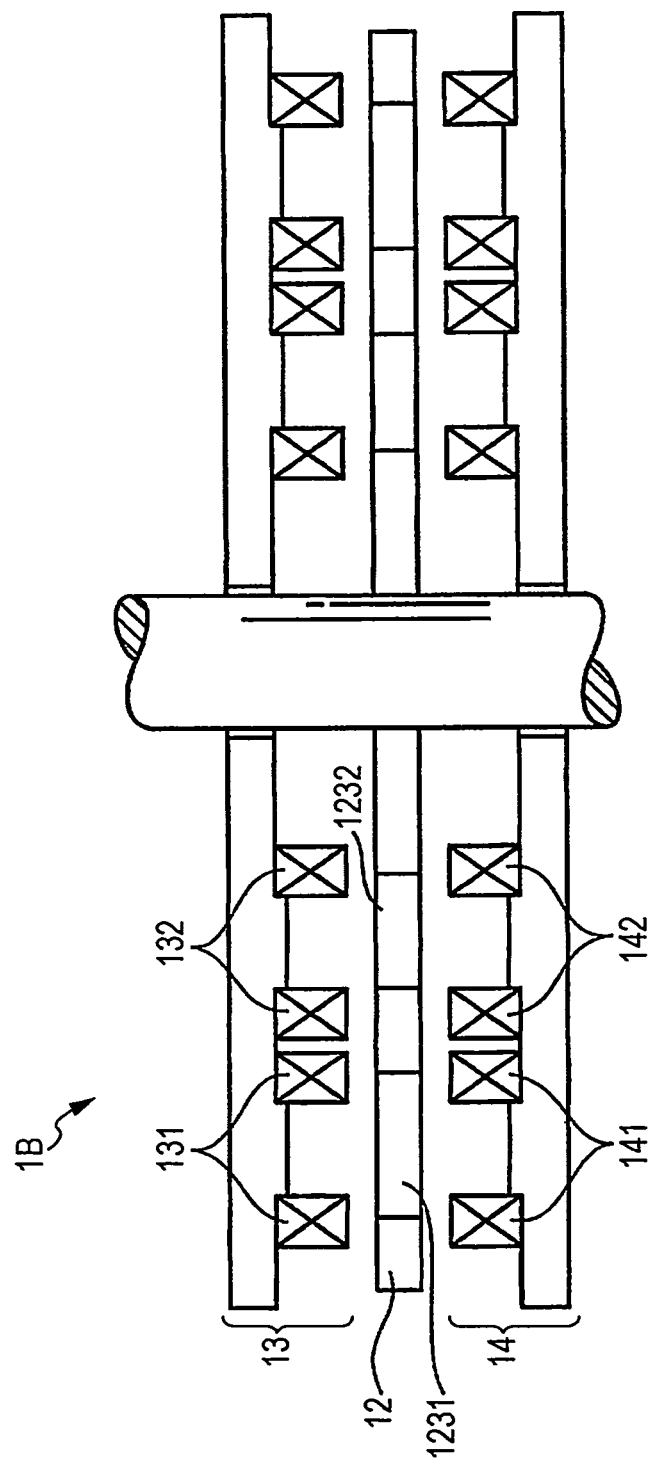
FIG. 11 is a schematic sectional view of the structure of an axial gap type brushless motor according to a third embodiment.
Figure 12:
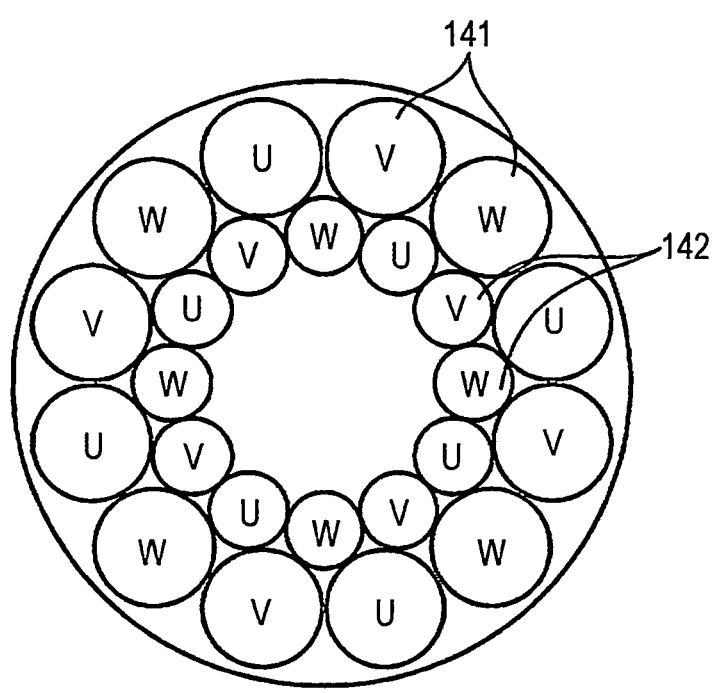
FIG. 12 is a Schematic front view of a stator of the axial gap type brushless motor illustrated in FIG. 11.

FIG. 11 is a schematic sectional view of the structure of a brushless motor 1B according to a third embodiment. FIG. 12 is a schematic front view of a stator 14 of the brushless motor 1B. As is the case with the above-described brushless motor 1, the brushless motor 1B is also an axial gap type brushless motor, in which a rotor 12 is interposed between stators 13 and 14 disposed on the upper and lower sides of the rotor 12 with gaps therebetween. Here, in the brushless motor 1B according to the present embodiment, as denoted by reference sings 131, 132; 141, 142, coils are arranged in a plurality (two in an example in FIGS. 11 and 12) in the radial directions. In order to correspond to this arrangement, as denoted by reference signs 1231 and 1232, permanent magnets are also arranged in a plurality (two in an example in FIGS. 11 and 12) in the radial directions. Torque is increased also with such a structure. Furthermore, with this structure, leakage of the magnetic flux is reduced. This structure is effective particularly in the case where the number of poles is small and gaps between the permanent magnets in the peripheral direction are large.

Next, another embodiment will be described.
(Fourth Embodiment)

Figure 13:
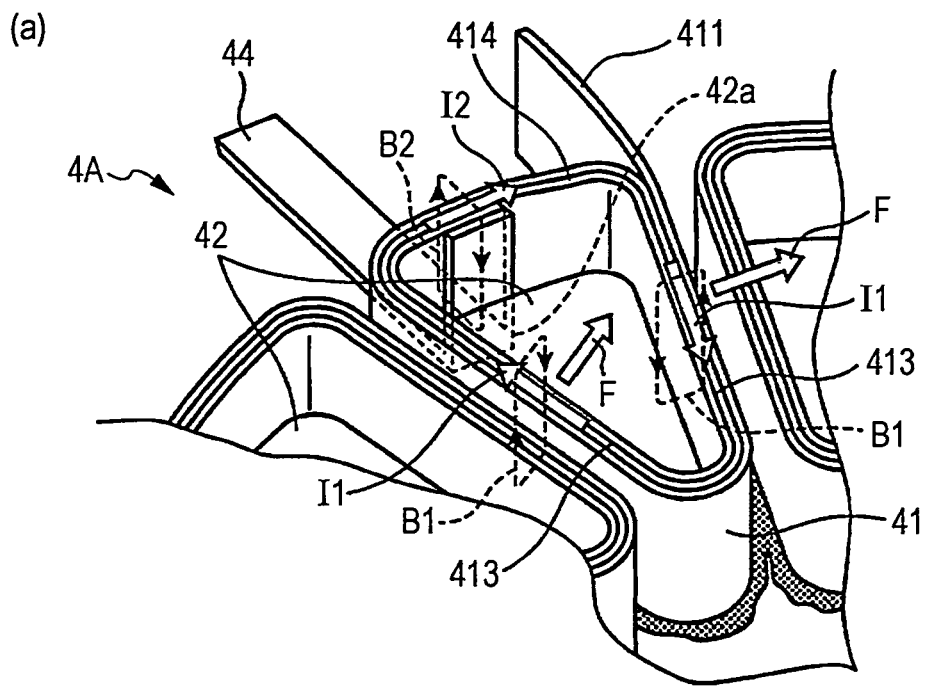
FIG. 13 includes schematic perspective views of the structure of an axial gap type brushless motor according to a fourth embodiment.
Figure 13:
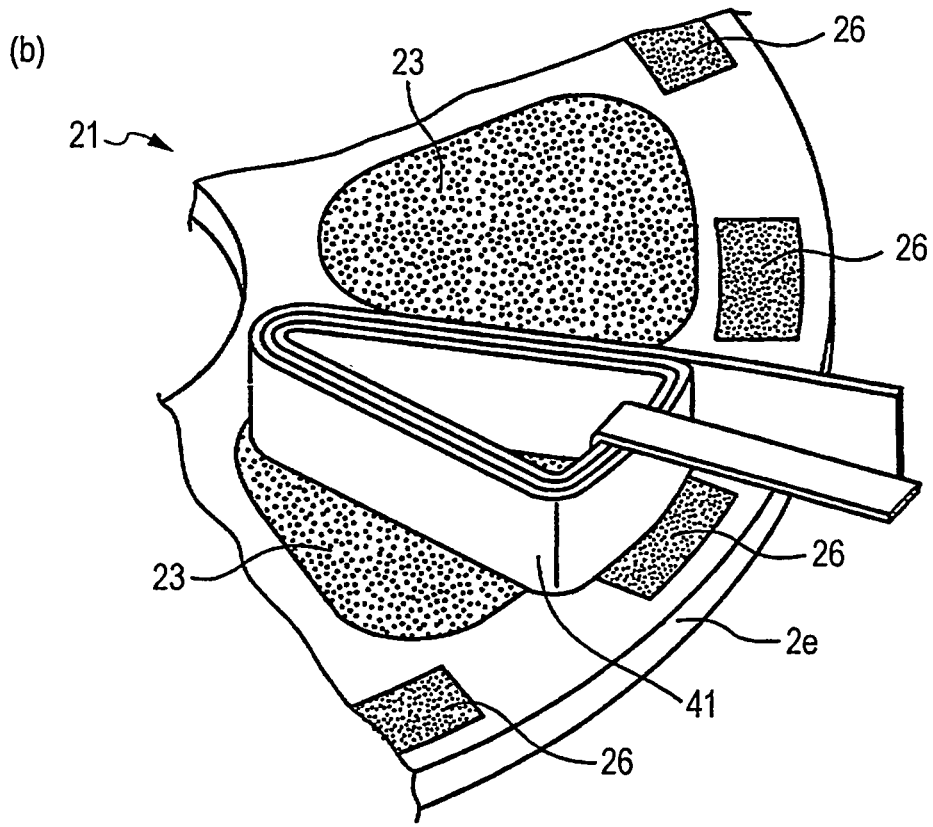

FIG. 13 includes schematic perspective views of the structure of a brushless motor 1C according to a fourth embodiment. The brushless motor 1C is similar to the above-described brushless motor 1A illustrated in FIGS. 1 to 6. Thus, corresponding components are denoted by the same reference signs and description thereof is omitted. FIG. 13 (*a*) illustrates, like the above-described FIG. 4, a structure on a stator 4A side, and in particular, the structure of the coil 41. FIG. 13

(b) illustrates the relationship between the coil 41 and a rotor 2e according to the present embodiment.

As described above, in the case where each coil 41 is formed of the spirally wound band-like wire, as illustrated in FIG. 13 (a), magnetic fields B1 are generated by currents I1 that flow through portions 413 extending in radial directions of the coil 41. The magnetic fields B1 act with a magnetic flux extending in the axial direction of the permanent magnet 23 so as to produce rotational torque F in the peripheral direction due to the above-described Lorentz force. However, a magnetic field B2, which is generated by a current I2 that flows through a portion 414 extending in the peripheral direction of the coil 41, does not act with the Magnetic flux of the permanent magnet 23 (markedly in particular at a part on the outer peripheral side in the case where the wound coil forms a triangular shape seen from the axial direction).

In the present embodiment, as illustrated in FIG. 13 (b), magnetic members 26 are periodically disposed in these portions of the rotor 2e, for example, at least on the outer peripheral side of each permanent magnet 23 in the peripheral direction. Thus, in the brushless motor 1C having such a structure, the magnetic members 26 are attracted by a rotating magnetic field generated by the coils 41, thereby producing torque that is synchronous with the rotating magnetic field in accordance with the principle of the so-called switched reluctance motor.

Thus, in the brushless motor 1C having the above-described structure, torque can be improved by, for example, about 20% due to effective use of the magnetic fields B2, which are generated by the portions 414 extending in the peripheral direction of the coils 41 and are wasted in the Lorentz force motor using the coils 41 and the permanent magnets 23.

Figure 14:
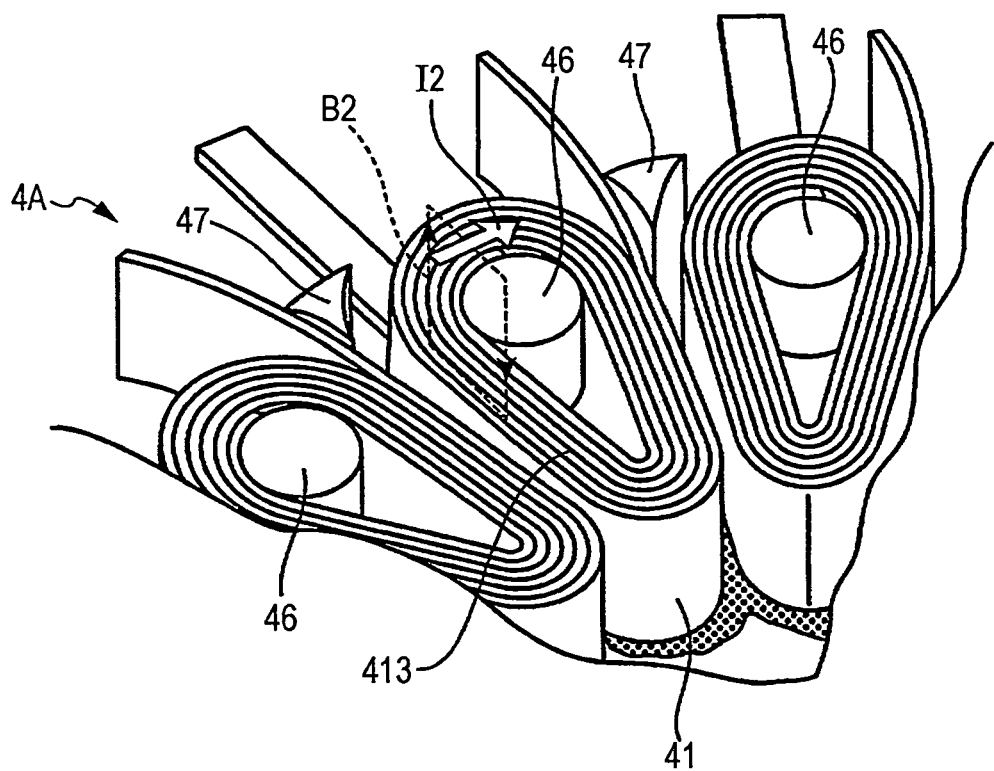
FIG. 14 is a schematic perspective view of the other structure of the axial gap type brushless motor according to the fourth embodiment.

FIG. 14 is a schematic perspective view of the structure of the brushless motor 1C according to the fourth embodiment having another structure. FIG. 14 illustrates, as is the case with FIG. 4 described above, the structure on the stator 4A side, and in particular, another structure of the coil 41. In the brushless motor 1C having such a structure, as illustrated in FIG. 14, in order to obtain further larger torque, the stator 4A may further include pole pieces 46 or pole pieces 47, or both of the pole pieces 46 and 47. The pole pieces 46 and 47 are formed of a magnetic material having a comparatively large magnetic permeability and interact with the magnetic members 26. The pole pieces 46, each of which has a column-like member formed of a magnetic material, are disposed at positions in core portions of the coils 41 at which the pole pieces 46 interact with the magnetic members 26. In an example illustrated in FIG. 14, each of the pole pieces 46 is a circular column-like member and has the same height as that of the coil 41 and, is disposed inside the core portion of the coil 41 close to the outer side of the coil 41. The pole pieces 47, each of which is a column-like member formed of a magnetic material, are disposed at positions between the coils 41 at which the pole pieces 47 interact with the magnetic members 26. In the example illustrated in FIG. 14, the pole pieces 47, each of which has a column-like member having a sector-shaped or triangular section and has the same height as that of the coil 41, are each disposed between two adjacent coils 41 on the outer side of the vertices of the coils 41. With such pole pieces 46 and 47 being arranged, the magnetic flux B is concentrated in the pole pieces 46 and 47, thereby allowing reluctance torque to be improved. Because of generation of alternating current magnetic flux, it is preferable that these pole pieces 46 and 47 be formed of, for example, ferrite or another magnetic material having high resistance and high magnetic permeability. The pole pieces 46 and 47 may be formed by binding a plurality of pure iron wires covered with an insulating material in the axial direction of the coils 41.

Figure 15:
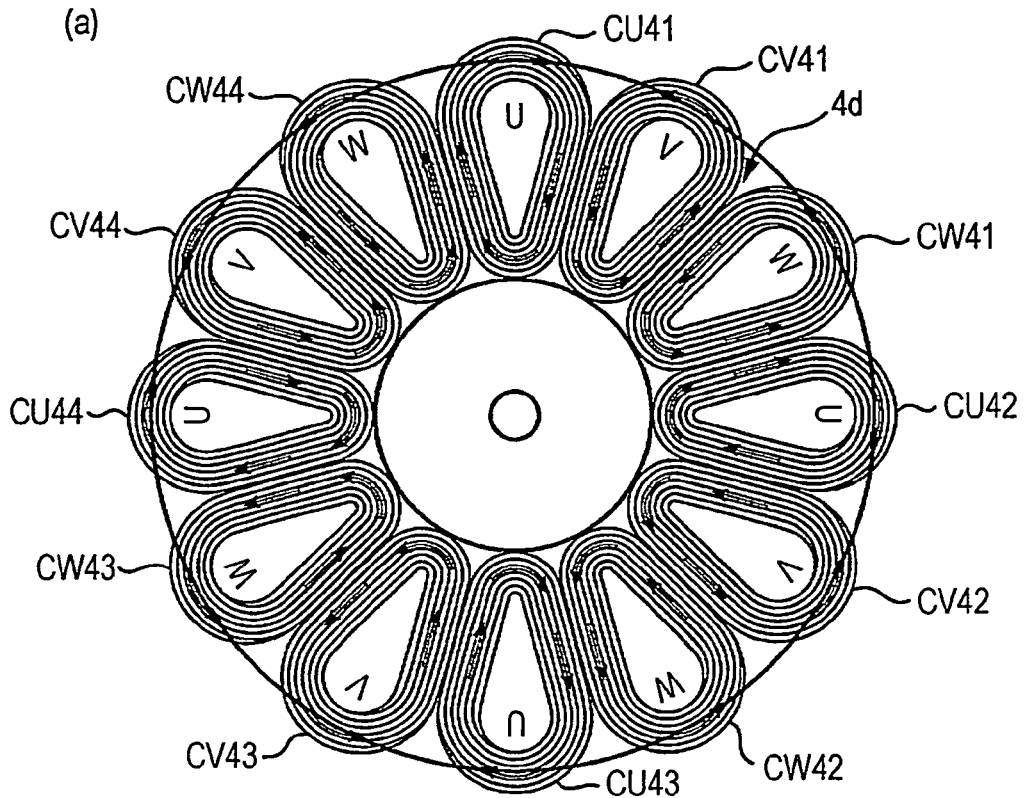
FIG. 15 includes schematic views of another structure of the axial gap type brushless motor according to the fourth embodiment.
Figure 15:
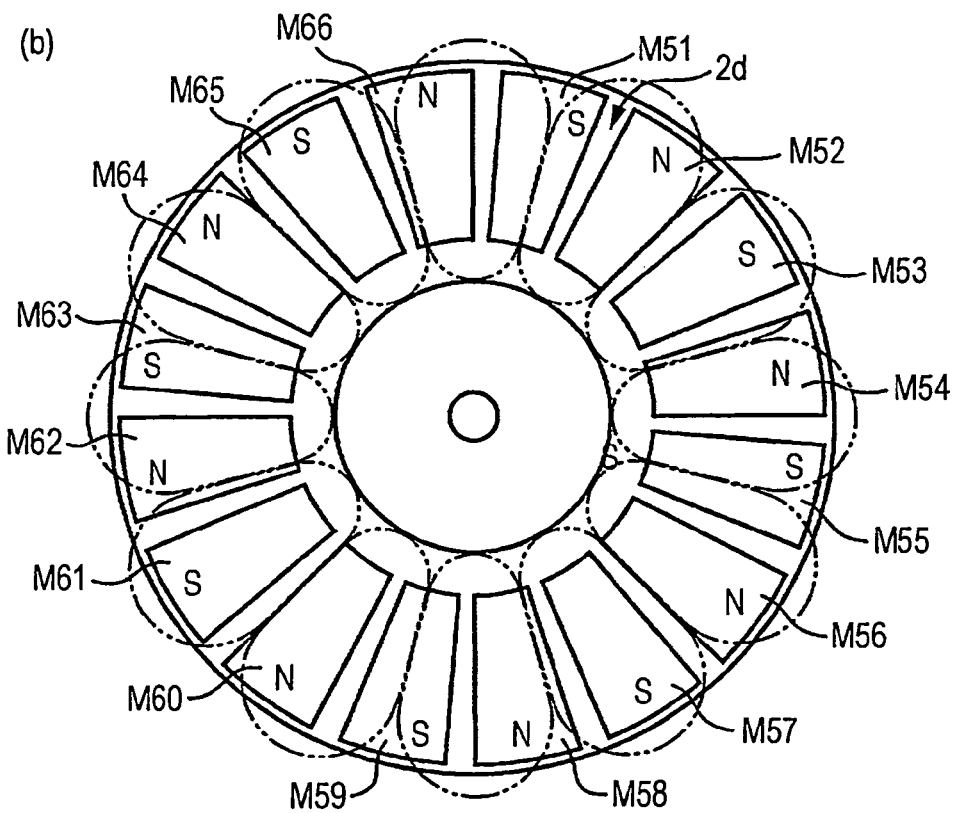

FIG. 15 includes views that schematically illustrate yet another structure of the brushless motor 1C according to the fourth embodiment. A schematic front view of a stator 4d is illustrated in (a), and a schematic front view of a rotor 2d is illustrated in (b). In these brushless motors, with respect to the peripheral direction, the interval between adjacent coils out of coils CU41, CV41, CW41, CU42, CV42, CW42, CU43, CV43, CW43, CU44, CV44, and CW44 (generally denoted by a reference sign C hereafter) is different from the interval between adjacent permanent magnets out of permanent magnets M51 to M66 (generally denoted by reference sign M hereafter), and the period at which the coils C are arranged is not a multiple of the period at which the permanent magnets M are arranged.

More specifically, when the coil currents are supplied in three phases of U, V, and, W, and, for example, as illustrated in FIG. 15, when 12 poles of the windings CU41, CV41, CW41, CU42, CV42, CW42, CU43, CV43, CW43, CU44, CV44, and CW44 are provided, 16 poles of the permanent magnets M51 to M66 are provided. Thus, the relationship between the number of winding poles and the number of permanent magnet poles is set on the basis of prime numbers different from each other (in the above examples, when the number of poles of windings is n, the number of poles of permanent magnets is 2·2(n/3)). By doing this, the interval between the adjacent coils C and the interval between the adjacent permanent magnets M cannot be made to match each other.

Next, another embodiment will be described.
(Fifth Embodiment)

Figure 16:
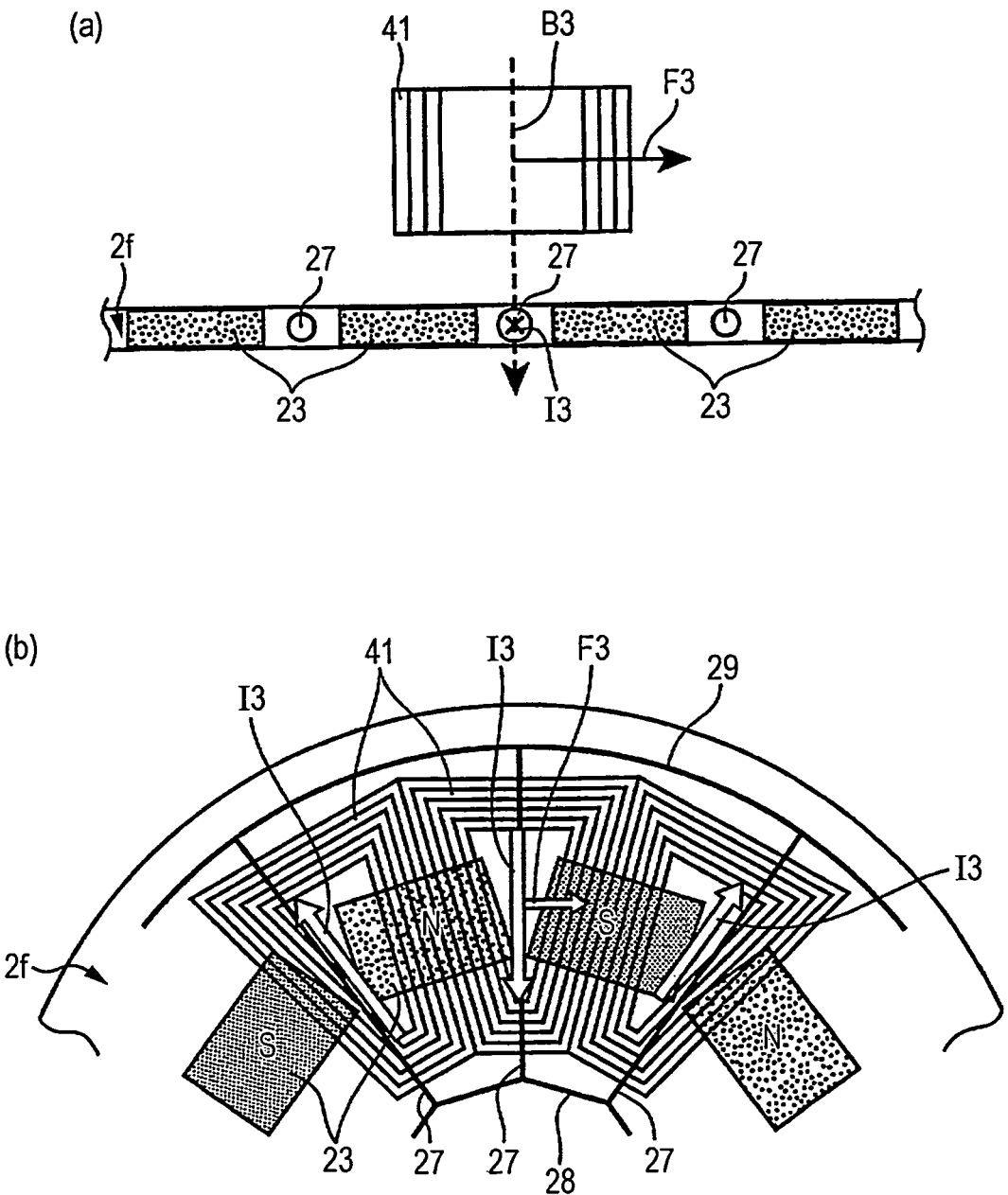
FIG. 16 includes schematic view of the structure of an axial gap type brushless motor according to a fifth embodiment.

FIG. 16 includes schematic views of the structure of a brushless motor 1D according to a fifth embodiment. The brushless motor 1D is also similar to the above-described brushless motor 1A illustrated in FIGS. 1 to 6. Accordingly, corresponding components are denoted by the same reference signs and description thereof is omitted. FIG. 16 (a) is a sectional view of the brushless motor 1D developed in the peripheral direction. FIG. 16 (b) is a plan view. In the present embodiment, the structure on the stator 4A side is the similar to that of the above-described brushless motor 1.

Here, in the present embodiment, a rotor 2f includes conductors 27 that extend in the radial directions between the permanent magnets 23 arranged in the peripheral direction and short-circuiting rings 28 and 29 that short-circuit ends of the conductors 27 on the inner and outer peripheral sides of the rotor 2f. With such a structure, as illustrated in FIG. 16 (b), when the conductors 27 and the short-circuiting rings 28 and 29 form current loops in the rotor 2f, a rotational magnetic field B3 generated by the coils 41 causes eddy currents I3 to be generated in the current loops. Although these eddy currents I3 basically cause losses, in the case where the speed of the rotor 2f is lower than a speed that is synchronous with the rotating magnetic field B3, that is, in the case where slip occurs, rotational torque F3 is produced by the eddy currents I3 flowing through the conductors 27 and the rotating magnetic field B3. The rotational torque F3 can be utilized when the brushless motor 1D is started, or to maintain the synchronous speed. That is, the brushless motor 1D according to the present embodiment is, as described above, an axial gap type brushless motor. However, with the conductors 27 and the above-described short-circuiting rings 28 and 29 provided in the rotor 2f, the function of the conductors 27 and the short-circuiting rings 28 and 29 in a manner similar to a squirrel cage of a radial gap type squirrel-cage induction motor can be utilized.

Thus, in particular, in a state in which the slip is large until the speed increases to the synchronous speed when the brushless motor 1D is started, the torque F3 of an induction motor is added. After the speed has reached the synchronous speed, torque is similarly produced by the slip occurring with a harmonic current that is included in the coil current. Thus, the brushless motor 1D having such a structure can produce increased torque.

Here, referring to the above-described FIG. 6, the frame 22, to which the permanent magnets 23 and the magnetic members 24 and 25 are attached, includes the ring-like hub 221 on the inner peripheral side, the concentric outer ring 222, and the spokes 223 extending in radial directions between the permanent magnets 23 so as to connect the hub 221 to the outer ring 222 as described above. Thus, when the frame 22 is formed of a non-magnetic and electrically conducting material such as aluminum, the frame 22 of the brushless motor 1D having such a structure can function as the above-described conductors 27 and the short-circuiting rings 28 and 29.

Furthermore, when, for example, the stator 4c illustrated in FIG. 10 is used, and coil currents, the phases of which are different from one another (40° shifted from one another), are applied to the respective nine poles of the windings CU31, CV31, CW31, CU32, CV32, CW32, CU33, CV33, and CW33, a larger slip occurs due to the rotational magnetic field produced by third harmonics compared to the slip occurring with a typical three-phase current. Thus, torque of the squirrel-cage induction motor can be increased. The reason for this will be described in detail below.

When a magnetic field generated by a coil is not sinusoidal, there are harmonic components. Even when a voltage applied to the coil has a sinusoidal waveform, the waveform of the magnetic field is not sinusoidal because of the shape of the coil or the positional relationship between the coil and the rotor. In particular, in the case where ON/OFF control is performed on each phase using switching, the waveform becomes rectangular and odd-order harmonics are generated. In this case, when a rotational magnetic field is generated by a three-phase alternating current, and its fundamental waves V11, V12, and V13 are given by the following expressions:

$$V11 = A \cdot \sin(\omega t),$$

$$V12 = A \cdot \sin(\omega t - 1/3 \cdot 2\pi), \text{ and}$$

$$V13 = A \cdot \sin(\omega t - 2/3 \cdot 2\pi),$$

then, the third harmonics V31, V32, and V33 are expressed as follow:

$$V31 = A \cdot \sin(3\omega t),$$

$$V32 = A \cdot \sin(3\omega t - 3 \cdot 1/3 \cdot 2\pi) = A \cdot \sin(3\omega t - 2\pi), \text{ and}$$

$$V33 = A \cdot \sin(3\omega t - 3 \cdot 2/3 \cdot 2\pi) = A \cdot \sin(3\omega t - 4\pi).$$

That is, V31=V32=V33, and no rotational magnetic field is generated.

Thus, it can be understood that, in the case of a three-phase alternating current, the presence of harmonics will increase losses. When the rotational magnetic field is generated by a nine-phase current, each of the phase differences between adjacent phases are $2\pi/9$. When the fundamental waves V11, V12, and V13 are given in the following expressions:

$$V11 = A \cdot \sin(\omega t),$$

$$V12 = A \cdot \sin(\omega t - 1/9 \cdot 2\pi) = A \cdot \sin(\omega t - 2\pi/9), \text{ and}$$

$$V13 = A \cdot \sin(\omega t - 2/9 \cdot 2\pi) = A \cdot \sin(\omega t - 4\pi/9),$$

then the third harmonics V31, V32, and V33 are expressed as follow:

$$V31 = A \cdot \sin(3\omega t),$$

$$V32 = A \cdot \sin(3\omega t - 3 \cdot 1/9 \cdot 2\pi) = A \cdot \sin(3\omega t - (1/3) \cdot 2\pi),$$

$$V33 = A \cdot \sin(3\omega t - 3 \cdot 2/9 \cdot 2\pi) = A \cdot \sin(3\omega t - (2/3) \cdot 2\pi).$$

Thus, it can be understood that the rotational magnetic field of three times the speed of the fundamental waves are generated in the same direction as the fundamental waves. Accordingly, also during synchronous rotation, a large slip is caused by the speed difference due to the three times faster speed, thereby adding torque caused by induction currents. Although there also is a possibility of torque being produced in the opposite rotational direction due to higher-order harmonics, that will not cause a problem because the main harmonic component is the third or the like.

Thus, using the nine-phase rotational magnetic field, the harmonic component can contribute to production of torque. A control system may be complex in order to generate the nine-phase coil current. However, it is sufficient that the components of the fundamental three phases are input to two types of phase-shift circuits so as to make the components to delay by 40° using each phase-shift circuit.

Next, another embodiment will be described.

(Sixth Embodiment)

Figure 17:
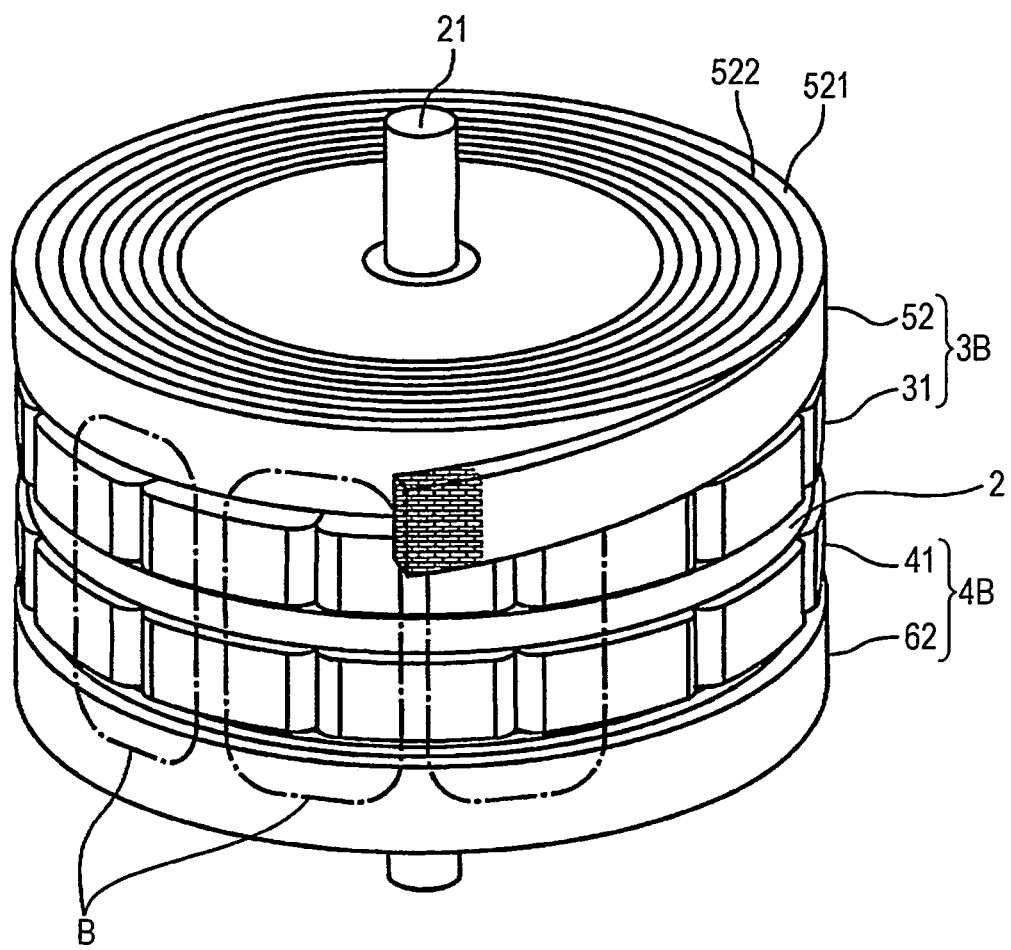
FIG. 17 is a schematic perspective view of the structure of an axial gap type brushless motor according to a sixth embodiment.

FIG. 17 is a schematic view of the structure of a brushless motor 1E according to a sixth embodiment. In the brushless motors 1A to 1D according to the first to fifth embodiments, the yokes 32 and 42 of the rotors 3A and 4A are formed of, for example, a soft magnetic powder by pressure molding, molding with heat, adhesive, or the like. The brushless motor 1E according to the sixth embodiment uses, as illustrated in FIG. 17, yokes 52 and 62 having a so-called pancake winding structure instead of the yokes 32 and 42.

More specifically, the brushless motor 1E is an axial gap type brushless motor, of which the rotor 2 is interposed between a pair of upper and lower stators 3B and 4B disposed so as to be spaced apart from each other in the axial direction of the output, shaft 21 of the brushless motor 1E. The stator 3B includes a plurality of the coils 31 and the yoke 52. Likewise, the stator 4B includes the plurality of coils 41 and the yoke 62. The rotor 2, the coils 31 and 41, and so forth are similar to the rotor 2, the coils 31 and 41, and so forth of the brushless motors 1A to 1D according to the first to fifth embodiments described above. Accordingly, corresponding components are denoted by the same reference signs and description thereof is omitted.

As illustrated in FIG. 17, the yokes 52 and 62 according to the present embodiment are each formed of a band-like soft magnetic material, which is wound such that the width direction of the soft magnetic material extends in the direction of the output shaft 21 of the rotor 2. More specifically, the yokes 52 and 62 according to the present embodiment are each formed of a band-like (tape-like, ribbon-like) soft magnetic material 521, one surface of which is covered with an insulating material 522, which is spirally wound so as to be in the form of the so-called single pancake winding. Alternatively, the yokes 52 and 62 according to the present embodiment are each formed of the band-like soft magnetic material 521 spirally wound together with a comparatively thin insulating sheet 522 disposed between turns of the soft magnetic material 521 so as to be in the form of the so-called single pancake winding. The band-like soft magnetic material 521 is obtained by, for example, rolling a pure iron-based or low silicon-added soft magnetic material so as to have a band-like shape, and after that, annealing the resultant material to make it have a soft magnetic property. The insulating coating 522 and the insulating sheet 522 are formed of, for example, a resin such as polyimide resin. A core portion of the yoke 52 defines an insertion hole for the output shaft 21, and, as is the case with the brushless motors 1A to 1D according to the first to fifth embodiments, the plurality of coils 31 are secured to one of the surfaces of the yoke 52 using, for example, adhesive or the like. Likewise, a core portion of the yoke 62 defines an insertion hole for the output shaft 21, and, as is the case with the brushless motors 1A to 1D according to the first to fifth embodiments, the plurality of coils 41 are secured to one of the surfaces of the yoke 62 using, for example, adhesive or the like.

Multiple yokes formed of, for example, a soft magnetic powder by pressure molding, molding with heat, adhesive, or the like can be collectively pressed in production. Although this is advantageous in terms of cost reduction, this demands large press equipment, and accordingly, this is not suitable for large-sized yokes. The yokes 52 and 62 according to the present embodiment, which are formed by winding the band-like soft magnetic material, can be easily produced not only in the case where the diameters thereof are small but also in the case where the diameters thereof are large. This can reduce the cost. Thus, the brushless motor 1E according to the present embodiment, the size of which is increased, can produce increased torque.

In the brushless motor 1E according to the present embodiment, the eddy currents flowing in the yokes 52 and 62 are generated in directions perpendicular to circular ring planes in the peripheral direction, the circular ring planes being planes indicated by dotted chain lines in FIG. 17, due to magnetic flux lines B flowing in these planes. In the present embodiment, the turns of the wound soft magnetic material 521 are insulated from one another using the insulating layer 522 formed of the insulating coating 522 or the insulating sheet 522, thereby allowing the eddy current to be effectively suppressed. Furthermore, in order to reduce an eddy current loss, the thickness of the soft magnetic material may be equal to or smaller than the above-described skin thickness δ. When the band-like soft magnetic material is produced by repeatedly performing rolling and heat treatment, a grain boundary structure is automatically oriented so as to extend in a direction in which the soft magnetic material is rolled, and the magnetic permeability is so increased in the direction of the orientation that, for example, the magnetic permeability approximates that of a so-called magnetic steel sheet. The yokes 52 and 62 formed of the band-like soft magnetic material, the yokes 52 and 62 being yokes produced in a way as described above, are more preferable in terms of the relationship with the magnetic flux lines B in the yokes 52 and 62.

Figure 18:
FIG. 18 includes explanatory views of a magnetostriction effect.
Figure 18:
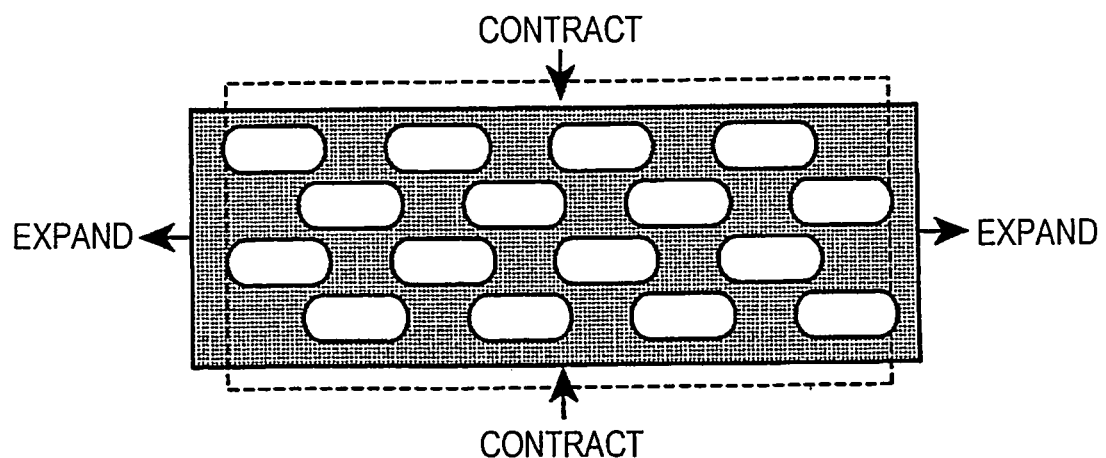

The brushless motor 1E according to the present embodiment can also suppress the magnetostriction effect produced in the yokes 52 and 62. FIG. 18 includes explanatory views of a magnetostriction effect. FIG. 18 (A) illustrates a case in which no magnetic field is present. FIG. 18 (B) illustrates a case in which a magnetic field is present. That is, as illustrated in FIG. 18 (A), in a magnetic material in a place where no magnetic field is present, directions of the N- and S-poles of micro magnets are not aligned with each other (a random state in which the micro magnets are directed in various directions) due to spinning of electrons. As illustrated in FIG. 18 (B), in a magnetic material in a place where a magnetic field is applied, the direction of the N- and S-poles of the micro magnets are aligned with each other. Thus, a strain (magnetostriction) occurs in which the entire magnetic material expands in a specified direction and contracts in the other specified direction. In the brushless motor 1E according to the present embodiment, due to the magnetostriction effect, expansion and contraction occur in the longitudinal direction of the band-like soft magnetic material. However, since the band-like soft magnetic material is wound, the expansion and contraction are absorbed as loosening and tightening of the winding in the peripheral direction. Even when the expansion and contraction occur, the expansion or contraction in the radial direction is decreased to 1/n (it represents the circular constant) to ⅓, thereby suppressing the magnetostriction effect.

Next, another embodiment will be described.
(Seventh Embodiment)

Figure 19:
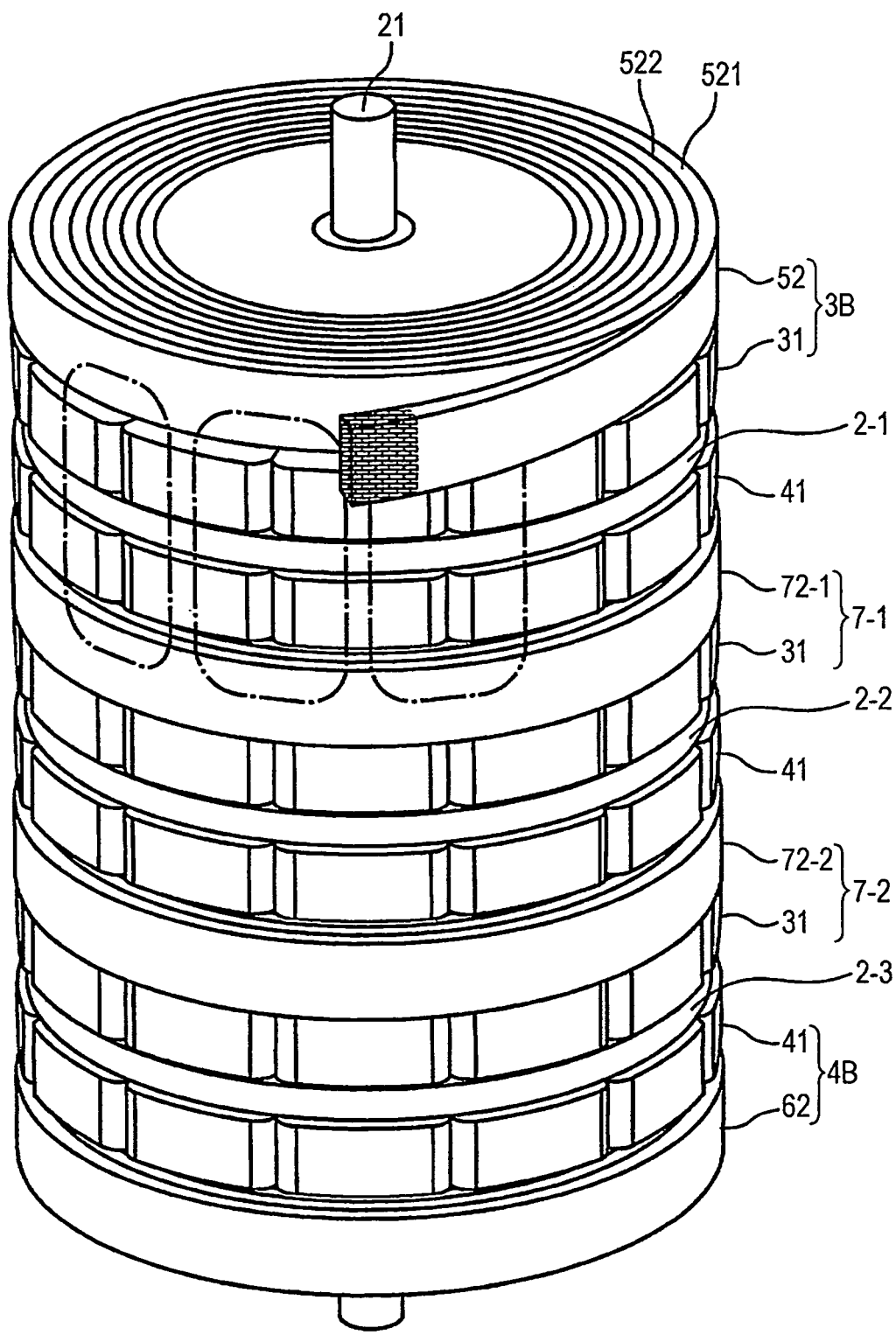
FIG. 19 is a schematic perspective view of the structure of an axial gap type brushless motor according to a seventh embodiment.

FIG. 19 is a schematic view of the structure of a brushless motor 1F according to a seventh embodiment. In the brushless motors 1A to 1E according to the first to sixth embodiments each include a single rotor 2. The brushless motor 1F according to the seventh embodiment includes a plurality of rotors 2, each of which are interposed between a pair of stators that generate respective rotational magnetic fields. FIG. 19 illustrates the brushless motor 1F, in which the structure of the brushless motor 1E according to the sixth embodiment is used to configure a three-layer structure. In an example illustrated in FIG. 19, the brushless motor 1F according to the seventh embodiment includes three rotors 2-1 to 2-3 and four stators 3B, 7-1, 7-2, and 4B. The rotors 2-1 to 2-3 and the stator 3B and 4B are similar to the rotors 2-1 to 2-3 and the stators 3B and 4B of the brushless motor 1E according to the above-described sixth embodiment. Thus, corresponding components are denoted by the same reference signs and description thereof is omitted.

Stators 7 (7-1 and 7-2) are each interposed between the rotors 2 at upper and lower positions thereof so as to generate rotating magnetic fields for the rotors 2 at the upper position and for the rotors 2 at the lower position. For this reason, the stators 7 (7-1 and 7-2) have respective yokes 72 similarly to the yokes 52 and 62. On one of surfaces of each yoke 72, the plurality of coils 41 are disposed similarly to those of the sixth embodiment, and on the other surface of each yoke 72, a plurality of coils 31 are disposed similarly to those of the sixth embodiment.

The brushless motor 1F according to the seventh embodiment has a structure in which the yoke 4B, the rotor 2-3, the yoke 7-2, the rotor 2-2, the yoke 7-1, the rotor 2-1, and the yoke 3B are sequentially stacked in the output shaft 21 direction with specified gaps therebetween.

The structures of the brushless motors 1A to 1D according to the first to fifth embodiments can be also used to configure respective multilayer structures in a manner similarly to that of the above-described structure.

Torque of the brushless motor increases substantially in proportion to the number of layers. Thus, the brushless motor 1F according to the seventh embodiment having such a structure can produce increased torque. Furthermore, with a structure such as this, by shifting phases of rotational magnetic fields of the layers little by little from one layer to another, so-called cogging torque is reduced.

In addition, in the plurality of coils 31 and 41, the cylindrical coils C as coils, and the coils 131, 132, 141, and 142 according to the first to seventh embodiments, the band-like wires may each further include a second soft magnetic material, which is disposed on one of side surfaces of the band-like wire, the one side surface being perpendicular to the axial direction, of a corresponding one of the coils 31 and 41, the cylindrical coils C, and the coils 131, 132, 141, and 142. With such a structure, a second soft magnetic material layer is disposed on the one side surface of the band-like wire, the band-like wire being perpendicular to the axial direction. Thus, the magnetic permeabilities in the plurality of coils 31 and 41, the cylindrical coils C, and the coils 131, 132, 141, and 142 are further increased. For this reason, in the case where the above-described second soft magnetic material layer is not provided, coil portions each in effect magnetically serve as a gap (magnetic gap) between the stator and the permanent magnet of the rotor, thereby causing distribution and dissipation of the magnetic flux to occur. With the structure including the second soft magnetic material layer, the flux that would otherwise be distributed or dissipated can be captured by the second soft magnetic material layer, thereby reducing the size of the gap from a gap between the stator and the permanent magnet of the rotor to a gap between the coil and the permanent magnet of the rotor. Thus, magnetic resistance can be decreased, and accordingly, the magnetic flux can be effectively introduced to the permanent magnet of the rotor. Thus, use of the plurality of coils 31 and 41, the cylindrical coils C, or the coils 131, 132, 141, and 142 having such a structure can further increase rotational torque of the axial gap type brushless motor.

Figure 20:
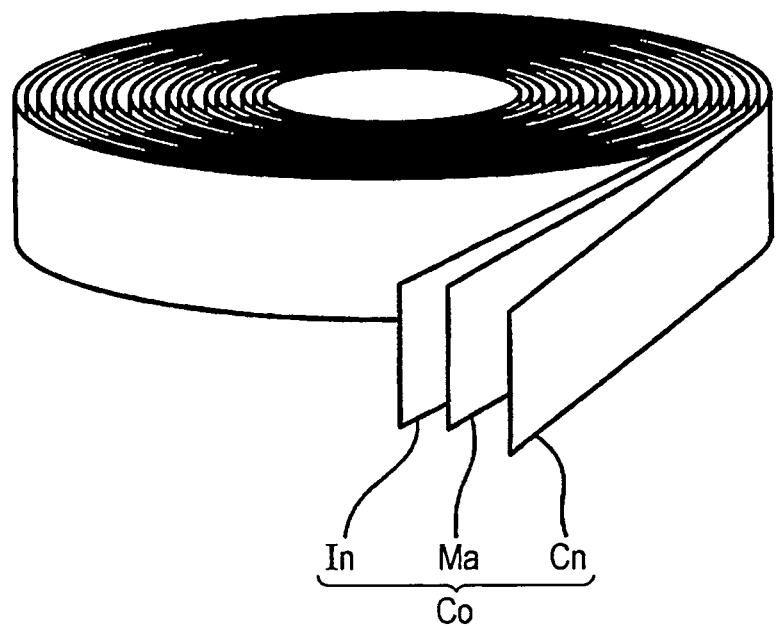
FIG. 20 is an explanatory view of the structure of a coil portion according to a modified embodiment.

FIG. 20 is an explanatory view of the structure of a coil portion according to a modified embodiment. Although FIG. 20 illustrates an example of a cylindrical coil Co having a structure as illustrated, the other coils 31, 41, 131, 132, 141, and 142 can also be illustrated in a similar manner.

More specifically, such a band-like wire is, for example, formed of a multilayer in which a conducting layer Cn, the second soft magnetic material layer Ma, and insulating layer In are stacked in a thickness direction thereof as illustrated in FIG. 20. The width (length in the axial direction) of the conducting material Cn and the width (length in the axial direction) of the second soft magnetic material Ma may be the same (match each other) or may be different from each other. Preferably, in order to allow one of ends of the second soft magnetic material Ma to be in contact with the stator 32 or 42, the width of the second soft magnetic material Ma is larger than the width of the conducting material Cn. The conducting layer Cn, the second soft magnetic material layer Ma, and the insulating layer In may be, for example, individual band-like (tape-like) materials as illustrated in FIG. 20, or may instead be a material, for example, in which one layer is covered with the other layer, although it is not illustrated.

When the individual band-like materials are used, the coil Co includes, for example, the conducting material Cn, which is a band-like elongated material formed of a specified material, the second soft magnetic material Ma, which is formed of a specified material and disposed on one of side surfaces of the conducting material Cn, the conducting material Cn being perpendicular to the axial direction, and the insulating material In, which is formed of a specified material and disposed on the one side surface of the conducting material Cn, the conducting material Cn being perpendicular to the axial direction, with the second soft magnetic material Ma therebetween. These conducting material Cn, second soft magnetic material Ma, and insulating material In are wound together so as to be sequentially stacked. That is, these conducting material Cn, second soft magnetic material Ma, and insulating material In are sequentially superposed with one another, bound together and spirally wound. For example, in the second embodiment, coils Co, which are modification of the plurality of coils C of the second embodiment, are each formed by sequentially stacking and winding such a material formed of the sequentially stacked conducting material Cn, second soft magnetic material Ma, and insulating material In. The coils 31 and 41, the cylindrical coils C, and the coils 131, 132, 141 and 142 according to the other embodiments are also similarly structured. More specifically, for example, the second soft magnetic material Ma may be disposed on the one side surface of the conducting material Cn by superposing a band-like elongated steel tape and a band-like elongated insulating material tape on a similarly band-like elongated copper tape.

In order to cover the conducting material C with the second soft magnetic material Ma, the second soft magnetic material Ma may be disposed on the one side surface of the conducting material Cn, for example, in the following method: the second soft magnetic material Ma is covered on the conducting material Cn by, for example, pressure bonding (thermo compression bonding or the like), plating (electrolytic plating or the like), or vapor deposition or the like. For example, by superposing copper tape and steel tape with each other and applying a load to the copper tape and steel tape while heating them, tape is formed by pressure bonding copper and steel. Alternatively, copper tape is plated with steel. In these examples, the copper is an example of the conducting material Cn, and the steel is an example of the second soft magnetic material Ma. In the copper tape on which a steel layer (thin film) is formed on the one side surface thereof, the current mainly flows through a portion formed of copper because the electrical conductivity of copper is about one digit larger than that of steel. In such a structure, a band-like wire covered with the second soft magnetic material Ma is wound so as to form the coil Co. This can improve the space factor with respect to the volume of the coil Co.

Although the above-described second soft magnetic material Ma is directly disposed on the one side surface of the conducting material Cn, the second soft magnetic material Ma may be indirectly disposed on the one side surface of the conducting material Cn with an insulating material therebetween.

Preferably, the thickness of the second soft magnetic material Ma (thickness of the second soft magnetic material Ma in a direction perpendicular to the axial direction) is equal to or smaller than the skin thickness δ in accordance with a frequency of the alternating current power supplied to the coil Co. With such a structure, generation of the eddy current can be reduced.

In the coil Co in which such a second soft magnetic material Ma is disposed on the one side surface of the conducting material Cn, the permeance (operating point) B/H is, as a result of an analysis of an equivalent magnetic circuit, given by the following expression 2-1 instead of the above-described expression 1-1, and expression 1-2 is replaced with expression 2-2.

[Math. 2]

$$\frac{B}{H} = \mu_0 \cdot \frac{T_{PM}}{2g} \cdot \frac{1}{\left\{ 1 + \frac{\mu_0}{\mu_c} \frac{T_c}{g} + \frac{1}{4} \cdot \frac{\mu_0}{\mu_y} \frac{W_{PM}}{T_Y} \frac{W_{PM}}{g} \cdot \left(1 + \frac{s}{W_{PM}}\right) \right\}} \quad (2\text{-}1)$$

$$B = B_r \cdot \frac{1}{\left\{ 1 + \frac{B_r}{\mu_0 H_e} \cdot \frac{2g}{T_{PM}} \left[ 1 + \frac{\mu_0}{\mu_c} \frac{T_c}{g} + \frac{1}{4} \cdot \frac{\mu_0}{\mu_y} \frac{W_{PM}}{T_Y} \frac{W_{PM}}{g} \cdot \left(1 + \frac{s}{W_{PM}}\right) \right] \right\}} \quad (2\text{-}2)$$

Here, μ is the relative magnetic permeability, $\mu_0$ is the magnetic permeability in a vacuum, and $B_r$ is an average magnetic flux density of the magnetic flux line paths. $T_{PM}$ is the thickness of the rotor, g is the gap between the rotor and the coil in the axial direction, $\mu_C$ is the permeability of the coil, $T_C$ is the thickness of the coil, $\mu_Y$ is the permeability of the stator (yoke), $T_Y$ is the thickness of the stator, s is a space between the permanent magnets of the rotor, and $W_{PM}$ is the width of the permanent magnet 23.

In the first to seventh embodiments, in order to further increase rotational torque, the numbers of turns of the plurality of coils 31 and 41, the cylindrical coils C, and the coils 131, 132, 141, and 142 need to be increased. Thus, more band-like wire is required and the size of a device is increased. However, when the above-described structure of the modified embodiment is used, an increase in the band-like wire and an increase in the size of the device can be suppressed. For example, when the coils are formed using copper tape, only by using pure iron-based material, the cost of which is comparatively low, the rotational torque can be increased. In the modified embodiment, the second soft magnetic material Ma is disposed in the plurality of coils 31 and 41, the cylindrical coils C, or the coils 131, 132, 141, and 142. Thus, in terms of the magnetic flux density, the magnetic flux lines are also distributed over the plurality of coils 31 and 41, the cylindrical coils C, or the coils 131, 132, 141, and 142. Thus, the magnetic flux density is further averaged, and accordingly, cogging torque can be reduced.

In the modified embodiment, when the coil is a cored coil having a magnetic coupling member in a core portion thereof, it is preferable that the magnetic coupling member have the magnetic permeability equivalent to the average magnetic permeability of a coil portion having the second soft magnetic material Ma. The magnetic coupling member having such a magnetic permeability is formed by, for example, compacting the above-described soft magnetic powder. When such a magnetic coupling member is provided in the core portion, even in the case where the coil is a cored coil, distribution of magnetic flux lines over the plurality of coils 31 and 41, the cylindrical coils C, or the coils 131, 132, 141, and 142 can be maintained.

Figure 21:
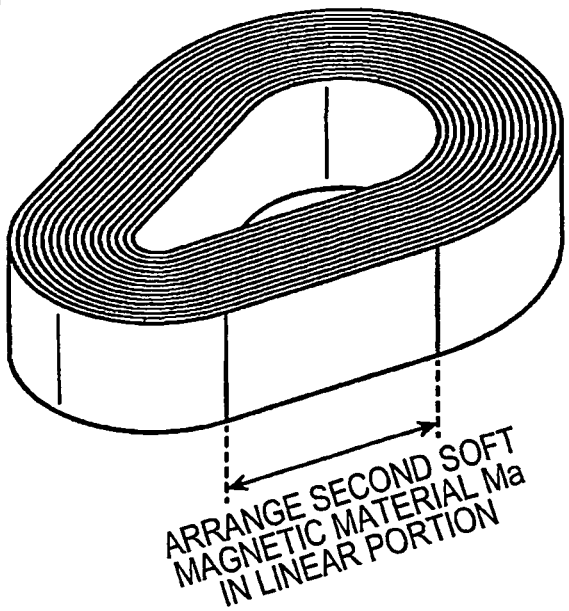
FIG. 21 includes explanatory views of another structure of a coil portion according to the modified embodiment.
Figure 21:
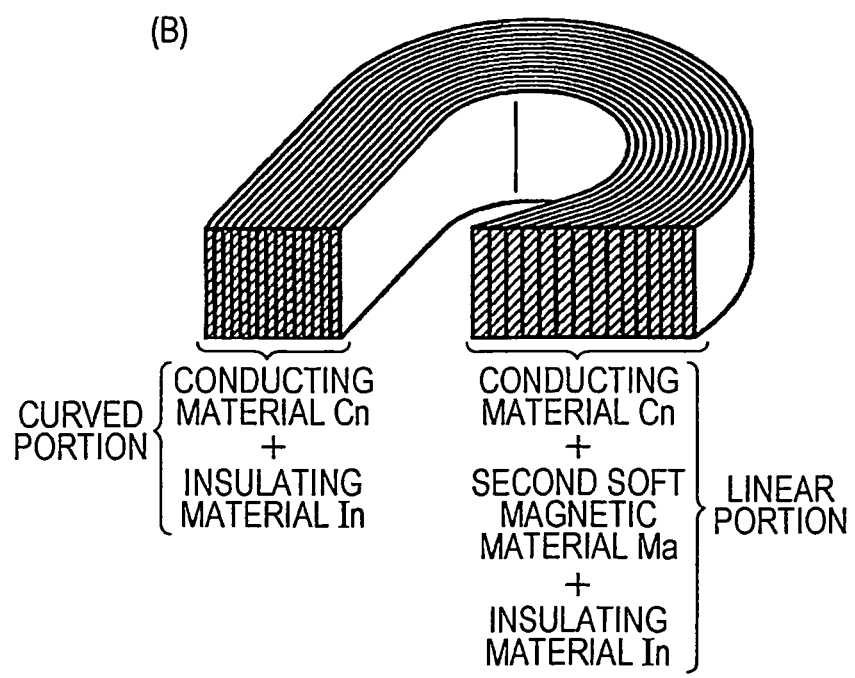

FIG. 21 includes explanatory views of another structure of a coil portion according to the modified embodiment. FIG. 21 (A) is a general perspective view, and FIG. 21 (B) is a longitudinal sectional view of a linear portion and a curved portion.

In the above-described modified embodiment, as illustrated in FIG. 21, the second soft magnetic material Ma may be arranged only in the linear portions of the so-called racetrack-like coils 31 and 41. In the present embodiment, the shapes of the coils 31 and 41 are not elliptical. The coils 31 and 41 are formed to have a modified racetrack shape, of which the degrees of curves in opposite curved portions are different from each other. In general, interaction between a permanent magnet of a rotor and a coil is relatively weak in curved portions of the coil and relatively strong in linear portions of the coil. Thus, in an axial gap type brushless motor that includes coils having such a structure, the magnetic flux is directed to the linear portions where the interaction is strong. Thus, rotational torque can be more effectively increased. This structure can also improve bending properties in the curved portions of the coil.

Although the inner rotor axial gap type brushless motor has been described, the axial gap type brushless motor may be of an outer rotor type. Such an outer rotor type can be preferably applied to, for example, an in-wheel motor.

Figure 22:
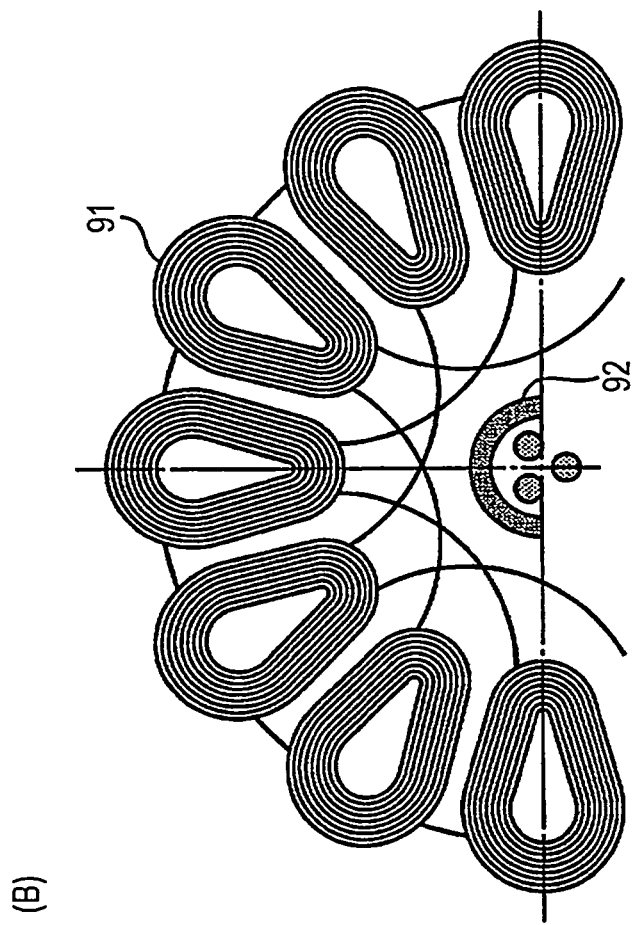
FIG. 22 includes views of the structure of an outer rotor axial gap type brushless motor.
Figure 22:
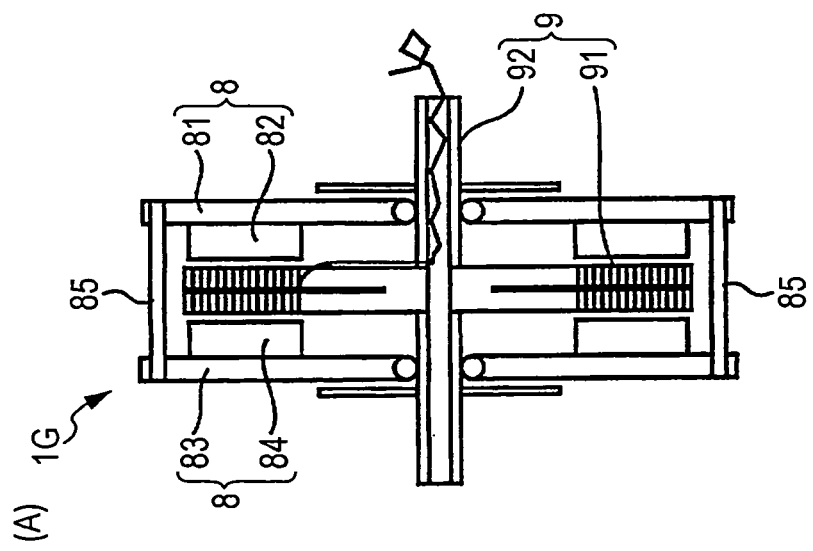
Figure 23:
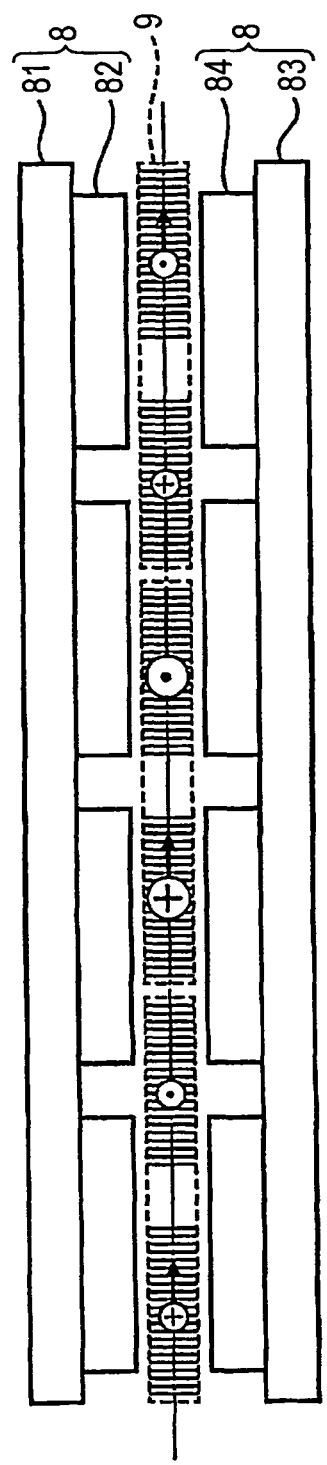
FIG. 23 schematically illustrates a magnetic circuit in the axial gap type brushless motor illustrated in FIG. 22.

FIG. 22 includes views of the structure of an outer rotor axial gap type brushless motor. FIG. 22 (A) is a longitudinal sectional view, and FIG. 22 (B) is a cross sectional view of the structure of a rotor. FIG. 22 (B) illustrates a half of the rotor. FIG. 23 schematically illustrates a magnetic circuit in the axial gap type brushless motor illustrated in FIG. 22.

More specifically, as illustrated in FIGS. 22 and 23, an outer rotor axial gap type brushless motor 1G includes, for example, a stator 9 that includes coils 91, and a rotor 8 that includes permanent magnets 82 and 84 and a pair of yokes 81 and 83, which oppose each other and are spaced apart from the stator 9 in the axial direction. The coils 91 are formed of band-like wires that are each spirally wound such that the width direction of the band-like wire generally coincides with the direction of the magnetic flux generated by the permanent magnets of the rotor 8.

The stator 9 includes a frame to which a fixed shaft 92 is secured at the center and the plurality of the coils 91 are attached. The frame has, for example, a hub, to which the fixed shaft 91 is secured, and a plurality of teeth that extend in radial directions and disposed in a peripheral direction. The stator 9 may further include a concentric outer ring. The plurality of coils 91 are fitted into and secured to respective spaces between the teeth. The fixed shaft 92 has a hollow cylindrical shape, which contains therein a plurality of wires that supply power to the plurality of coils 91. The rotor 8 includes the disc-like yoke 81 that includes the plurality of permanent magnets 82 disposed in the peripheral direction, and the disk-like yoke 83 that includes the plurality of permanent magnets 84 disposed in the peripheral direction. The yoke 81 and the yoke 83 are disposed such that the coils 91 of the stator 9 are interposed between the permanent magnets 82 of the yoke 81 and the permanent magnets 84 of the yoke 83. In order to maintain such a relationship between arranged positions, the rotor 8 further includes a support member 85 between the yoke 81 and the yoke 83 along an outer peripheral edges of the yoke 81 and the yoke 83 so as to allow the yoke 81 and the yoke 83 to be spaced apart from each other by a specified distance. The yoke 81 and the yoke 83 of the rotor 8 each have an insertion hole formed therein at the center (central point) thereof. The fixed shaft 92 of the stator 9 is inserted through the insertion holes. The yoke 81 and the yoke 83 of the stator 8 are rotatably supported by the fixed shaft 92 of the stator 9 with, for example, ball bearings or the like.

The outer rotor axial gap type brushless motor 1G having such a structure can be configured similarly to the above-described inner rotor brushless motor. Furthermore, because of the outer rotor configuration, the axial gap type brushless motor 1G may also have the following structures.

That is, first, the yoke 81 and the yoke 83 may also be formed of bulk pure iron. Second, the support member 85 is not necessarily a thick cylindrical yoke. The support member 85 may be a bar-shaped member (circular column-like member) like a so-called brace bar. Third, the stator 9 may use an aluminum alloy gear structure having teeth, the number of which is equal to the number of poles, at an outer edge. In this case, the cored coils 91 or the coils 91 wound together with steel are disposed in and secured to spaces between teeth. The core of each cored coil 91 uses, for example, a pure iron-based or alloy-based green compact. The coil 91 wound together with steel uses, for example, a band-like wire formed by rolling a pure iron-based steel bar into a tape-like shape and covering it with an insulating material. The coil 91 is formed to have, for example, a double pancake structure. The leads of the coil 91 are routed outward in the axial direction, connected to a pattern near the fixed shaft 92, and bound as three three-phase wires that are guided into the hollow at the center of the fixed shaft 92.

Out of a variety of forms of technologies disclosed in the present description as described above, the main technologies are summarized as follows.

According to a form of implementation, an axial gap type brushless motor includes a stator that includes coils and a rotor that includes a permanent magnet and is spaced apart from the stator in the axial direction. In the axial gap type brushless motor, each coil is formed of a band-like wire that is spirally wound such that a width direction of the band-like wire generally coincides with a direction of a magnetic flux generated by the permanent magnet of the rotor.

With the above-described structure, each coil is formed of the band-like (tape-like, ribbon-like) wire that is spirally wound such that the width direction of the band-like wire generally coincides with the direction of the magnetic flux generated by the permanent magnet of the rotor. In the axial gap type brushless motor having such a structure, a sectional area of the wire on a surface perpendicular to the magnetic flux can be decreased, and accordingly, an eddy current loss can be reduced.

Preferably, each coil has a magnetic yoke having a magnetic isotropy. With this structure, the magnetic flux is perpendicular to a direction of a coil current. This can lead to highly efficient production of torque and reduction of the eddy current in the coil. Thus, motor efficiency can be improved with the axial gap type brushless motor having such a structure.

Preferably, with respect to the peripheral direction, the interval between the adjacent coils is different from the interval between the adjacent permanent magnets, and the period at which the permanent magnets are arranged is not a multiple of the period at which the coils are arranged. With this structure, for example, when the coil currents are supplied in three phases of U, V, and, W and three poles of windings are provided, four poles of permanent magnets are provided, when six poles of windings are provided, eight poles of permanent magnets are provided, and when nine poles of windings are provided, 12 poles of permanent magnets are provided. Thus, the relationship between the number of poles of windings and the number of poles of permanent magnets is set on the basis of prime numbers different from each other (in the above examples, when the number of poles of windings is n, the number of poles of permanent magnets is $2 \cdot 2(n/3)$). By doing this, the interval between the adjacent coils and the interval between the adjacent permanent magnets cannot be made to match each other. This can reduce a torque ripple in the axial gap type brushless motor having such a structure.

According to another form of implementation, the above-described axial gap type brushless motor further includes a thermally conductive material that fills a gap between each coil and a yoke on the stator side, the stator being a stator on which the coil is mounted.

With the above-described structure, the gap between each coil and the yoke on the stator side, the stator being a stator on which the coil is mounted, is filled with a thermally conductive material, for example, such as a silicone grease or alumina. Thus, use of band-like wire and employing, for example, the so-called single pancake winding structure, heat produced in the winding is transferred to an end portion of the coil due to a good thermal conductivity of the wire formed of copper or the like. After that, using the thermally conductive material, the heat can be further transferred to the yoke with a good thermal conductivity. Thus, in the axial gap type brushless motor having such a structure, the heat dissipation property of the coil can be improved, and accordingly, large torque can be obtained by increasing the coil current, or a smaller axial gap type brushless motor, with which the same amount of the torque is obtainable, can be obtained.

According to another form of implementation, in the above-described axial gap type brushless motor, the rotor further includes a plurality of magnetic members periodically disposed in the peripheral direction at least on outer peripheral sides of the permanent magnets.

With the above-described structure, in the case where each coil is formed of the spirally wound band-like wire, magnetic fields are generated by portions of each coil extending in the radial direction of the coil. These magnetic fields act with the magnetic flux extending in the axial direction of the permanent magnet so as to produce rotational torque due to the Lorentz force in the peripheral direction. However, a magnetic field generated in a portion extending in the peripheral direction of the coil does not act with the magnetic flux of the permanent magnet (markedly observed in particular at a part on the outer peripheral side in the case where the wound coil forms a triangular shape seen from the axial direction). However, with the magnetic members periodically arranged in such portions of the rotor, the magnetic members are attracted by a rotating magnetic field, thereby producing torque that is synchronous with the rotating magnetic field in accordance with the principle of a so-called switched reluctance motor. Thus, in the axial gap type brushless motor having such a structure, torque can be improved due to effective utilization of the magnetic fields, which are generated in the portions extending in the peripheral direction of the coils and would be wasted in the Lorentz force motor using the coils and permanent magnets.

According to another form of implementation, in the above-described axial gap type brushless motor, the plurality of permanent magnets are arranged in the peripheral direction, and the rotor includes conductors that extend in the radial directions between the permanent magnets arranged in the peripheral direction and short-circuiting rings that short-circuit ends of the conductors on an inner and outer peripheral sides of the rotor.

With the above-described structure, the conductors and the short-circuiting rings function in a manner similar to a squirrel-cage of a radial gap type squirrel-cage induction motor. Thus, in the axial gap type brushless motor having such a structure, in particular, in a state in which the slip is large until the speed increases to the synchronous speed when the brushless motor is started, the torque of an induction motor is added. After the speed has reached the synchronous speed, torque is similarly produced by the slip occurring with a harmonic current that is included in the coil current, thereby allowing torque to be increased.

According to another form of implementation, in the above-described axial gap type brushless motor, the conductors and short-circuiting rings are included in a frame, which is secured to a rotating shaft and into which the permanent magnets are fitted.

In the axial gap type brushless motor having such a structure, when the conductors and the short-circuiting rings that function in a manner similar to the squirrel-cage of the squirrel-cage induction motor are formed of, for example, aluminum or another non-magnetic and electrically conducting material, the conductors and the short-circuiting rings can also function as the frame, which is part of the rotor and secured to a rotating shaft and into which the permanent magnets are fitted.

According to another form of implementation, in the above-described axial gap type brushless motor, the coils are each supplied with a coil current in a corresponding one of nine phases.

In the axial gap type brushless motor having such a structure, when a nine-phase coil current is used, torque of the squirrel-cage induction motor can be increased due to the rotational magnetic field produced by third harmonics.

According to another form of implementation, in the above-described axial gap type brushless motor, a pair of the stators are provided on both sides of the rotor.

In the axial gap type brushless motor having such a structure, the common rotor is interposed between the pair of stators so as to be driven by both the stators. Thus, substantially twice as much torque can be realized with a thickness that is far less than twice the thickness.

According to another form of implementation, in the above-described axial gap type brushless motor, the plurality of coils are arranged in the radial direction.

The axial gap type brushless motor having such a structure can produce increased torque.

According to another form of implementation, in the above-described axial gap type brushless motor, the yoke of the stator, which has a magnetic isotropy, is formed by molding a soft magnetic powder.

For the axial gap type brushless motor having such a structure, a desired magnetic characteristic can be comparatively easily obtained and a desired shape can be comparatively easily formed.

According to another form of implementation, in the above-described axial gap type brushless motor, particles of the soft magnetic powder are covered with an electrically insulating layer.

In the axial gap type brushless motor having such a structure, current flowing through the yoke can be reduced. Thus, an eddy current loss in the yoke can be reduced.

According to another form of implementation, in the above-described axial gap type brushless motor, the yoke of the stator is formed of a band-like soft magnetic material that is wound such that a width direction of the soft magnetic material extends in a direction in which the rotating shaft of the rotor extends.

With the above-described structure, a large yoke of the stator can be comparatively easily formed. Thus, torque produced by the axial gap type brushless motor having such a structure can be increased by increasing the size of the axial gap type brushless motor.

According to another form of implementation, in the above-described axial gap type brushless motor, an insulating layer is further provided between turns of the wound soft magnetic material.

With the above-described structure, electrical resistance in the radial direction is increased. Thus, in the axial gap type brushless motor having such a structure, the eddy current loss can be reduced.

According to another form of implementation, in the above-described axial gap type brushless motor, the band-like wire further includes a second soft magnetic material disposed on one of side surfaces of the band-like wire, the one side surface being perpendicular to the axial direction.

With the above-described structure, the second soft magnetic material is disposed on the one side surface of the band-like wire, the band-like wire being perpendicular to the axial direction. Thus, the magnetic permeability of the coil portion is further increased. The magnetic flux, which would be distributed and dissipated when the second soft magnetic material is not provided, can be captured by the second soft magnetic material and effectively introduced to the permanent magnet of the rotor. This can further increase the rotational torque.

According to another form of implementation, in the above-described axial gap type brushless motor, each coil has linear portions in the peripheral direction, and the second soft magnetic material is arranged in the linear portions.

In a so-called racetrack-like coil, interaction between the permanent magnet of the rotor and the coil is relatively weak in curved portions of the coil and relatively strong in linear portions of the coil. For this reason, with the above-described structure, the magnetic flux is directed to the linear portions where the interaction is strong. Thus, rotational torque can be more effectively increased.

According to another form of implementation, in the above-described axial gap type brushless motor, the thickness of the second soft magnetic material in a direction perpendicular to the axial direction is equal to or smaller than a skin thickness in accordance with a frequency of an alternating current power supplied to each coil.

With the above-described structure, generation of the eddy current can be reduced.

According to another form of implementation, in the above-described axial gap type brushless motor, the band-like wire is covered with the second soft magnetic material.

With the above-described structure, the band-like wire which is covered with the second soft magnetic material is wound so as to form the coil, in which the second soft magnetic material is disposed on the one side surface of the band-like wire, the band-like wire being perpendicular to the axial direction. This can improve the space factor with respect to the volume of the coil.

The present application is filed on the basis of Japanese Patent Application No. 2010-1495 filed on Jan. 6, 2010, Japanese Patent Application No. 2010-129037 filed on Jun. 4, 2010, Japanese Patent Application No. 2010-169445 filed on Jul. 28, 2010, and Japanese Patent Application No. 2010-246560 filed on Nov. 2, 2010, the contents of which are incorporated herein.

Although the present invention has been adequately and sufficiently described through the embodiments with reference to the drawings in order to express the present invention, it should be appreciated that those skilled in the art can easily modify and/or improve the above-described embodiments. Accordingly, it should be understood that, unless modified or improved embodiments implemented by those skilled in the art are departing from the scope of rights claimed in the CLAIMS, the modified or improved embodiments are included in the scope of the claimed rights.

Industrial Applicability

According to the present invention, an axial gap type brushless motor can be provided.

The invention claimed is:

1. An axial gap type brushless motor, comprising:
   a stator that includes a coil; and
   a rotor that includes a permanent magnet, the rotor being spaced apart from the stator in an axial direction,
   wherein the coil is formed of a band-like wire that is spirally wound such that a width direction of the band-like wire generally coincides with a direction of a magnetic flux generated by the permanent magnet of the rotor,
   wherein a plurality of the permanent magnets are arranged in a peripheral direction, and
   wherein the rotor includes
   conductors that extend in a radial direction between the permanent magnets arranged in the peripheral direction, and
   short-circuiting rings that short-circuit ends of the conductors on inner and outer peripheral sides of the rotor.

2. The axial gap type brushless motor according to claim 1, further comprising:
   a thermally conductive material that fills a gap between the coil and a yoke on the stator side, the stator being a stator on which the coil is mounted.

3. The axial gap type brushless motor according to claim 1, wherein the rotor further includes a plurality of magnetic members periodically disposed in a peripheral direction at least on an outer peripheral side of the permanent magnet.

4. The axial gap type brushless motor according to claim 1, wherein the conductors and the short-circuiting rings are included in a frame, the frame being secured to a rotating shaft, the permanent magnets being fitted into the frame.

5. The axial gap type brushless motor according to claim 1, wherein the coils are each supplied with a coil current in a corresponding one of nine phases.

6. The axial gap type brushless motor according to claim 1, wherein a pair of the stators are provided on both sides of the rotor.

7. The axial gap type brushless motor according to claim 1, wherein a plurality of the coils are arranged in a radial direction.

8. The axial gap type brushless motor according to claim 1, wherein a yoke of the stator is formed by molding a soft magnetic powder, the yoke having a magnetic isotropy.

9. The axial gap type brushless motor according to claim 8, wherein particles of the soft magnetic powder are covered with an electrically insulating layer.

10. The axial gap type brushless motor according to claim 1, wherein a yoke of the stator is formed of a band-like soft magnetic material that is wound such that a width direction of the soft magnetic material extends in a direction in which a rotating shaft of the rotor extends.

11. The axial gap type brushless motor according to claim 10, wherein an insulating layer is further provided between turns of the wound soft magnetic material.

12. The axial gap type brushless motor according to claim 1, wherein the band-like wire further includes a second soft magnetic material disposed on one of side surfaces of the band-like wire, the one side surface being perpendicular to the axial direction.

13. The axial gap type brushless motor according to claim 12, wherein the coil has a linear portion in a peripheral direction, and the second soft magnetic material is arranged in the linear portion.

14. The axial gap type brushless motor according to claim 12, wherein a thickness of the second soft magnetic material in a direction perpendicular to the axial direction is equal to or smaller than a skin thickness in accordance with a frequency of an alternating current power supplied to the coil.

15. The axial gap type brushless motor according to claim 12, wherein the band-like wire is covered with the second soft magnetic material.

* * * * *